US011052953B2

(12) United States Patent
Holden et al.

(10) Patent No.: US 11,052,953 B2
(45) Date of Patent: Jul. 6, 2021

(54) TANK TRAILER WRAP

(71) Applicant: Tank Trailer Technologies LLC, Morris, IL (US)

(72) Inventors: Mark R. Holden, West Lafayette, IN (US); Scot McQuilkin, Homer Glen, IL (US); Brian Farley, Earlville, IL (US)

(73) Assignee: Tank Trailer Technologies LLC, Morris, IL (US)

( * ) Notice: Subject to any disclaimer, the term of this patent is extended or adjusted under 35 U.S.C. 154(b) by 97 days.

(21) Appl. No.: 16/585,950

(22) Filed: Sep. 27, 2019

(65) Prior Publication Data

US 2020/0023912 A1 Jan. 23, 2020

Related U.S. Application Data

(63) Continuation of application No. 16/156,777, filed on Oct. 10, 2018, now Pat. No. 10,427,729.

(60) Provisional application No. 62/645,790, filed on Mar. 20, 2018, provisional application No. 62/570,335, filed on Oct. 10, 2017.

(51) Int. Cl.
*B62D 35/00* (2006.01)
*B60P 3/22* (2006.01)

(52) U.S. Cl.
CPC ............ *B62D 35/001* (2013.01); *B60P 3/224* (2013.01)

(58) Field of Classification Search
CPC .. B62D 35/001; B62D 35/002; B62D 35/008; B62D 35/005; B62D 35/02; B60P 3/22; B60P 3/224; B60P 3/2205; B60R 3/005
USPC .................... 296/180.4, 186.4; 280/837–839
See application file for complete search history.

(56) References Cited

U.S. PATENT DOCUMENTS

| | | | |
|---|---|---|---|
| 2,056,179 | A | 10/1936 | Fitch |
| 3,016,623 | A | 10/1962 | Wallace |
| 4,402,544 | A | 9/1983 | Artim et al. |
| 4,518,188 | A | 5/1985 | Witten |
| 4,668,007 | A | 5/1987 | Sloan |
| 4,966,407 | A | 10/1990 | Lusk |
| 5,058,946 | A | 10/1991 | Faber |
| 6,092,856 | A | 7/2000 | Ladensack |
| 6,224,141 | B1 | 5/2001 | Brodio |

(Continued)

FOREIGN PATENT DOCUMENTS

WO WO 2015191472 12/2015

OTHER PUBLICATIONS

Lawrence Livermore National Laboratory, DOE's Effort to Improve Heavy Vehicle Fuel Efficiency through Improved Aerodynamics, DOE Annual Merit Review, Project ID #VSS006, Jun. 8, 2015, retrieved from https://energy.gov/sites/prod/files/2015/07/24/vss006_salari_2015_0.pdf.

(Continued)

*Primary Examiner* — Gregory A Blankenship
(74) *Attorney, Agent, or Firm* — Faegre Drinker Biddle & Reath LLP

(57) ABSTRACT

An aerodynamic wrap for use with a tank trailer illustratively includes opposing first and second side assemblies. In an illustrative embodiment, each side assembly includes an upper panel pivotably supported by the tank trailer, and a lower panel pivotably supported by the upper panel. A lower connecting member illustratively couples the lower panels of the first and second side assemblies under the belly of the tank trailer.

22 Claims, 30 Drawing Sheets

(56) References Cited

U.S. PATENT DOCUMENTS

| | | |
|---|---|---|
| 6,932,419 B1 | 8/2005 | McCullough |
| 7,380,868 B2 | 6/2008 | Breidenbach |
| 8,186,745 B2 | 5/2012 | Graham et al. |
| 8,573,680 B2 | 11/2013 | Smith |
| 8,651,547 B2 | 2/2014 | Alguera Gallego |
| 8,845,008 B1 | 9/2014 | Maiorana et al. |
| 9,090,294 B2 | 7/2015 | Johnson |
| 9,126,638 B2 | 9/2015 | Breidenbach |
| 9,162,716 B2 | 10/2015 | Nusbaum |
| 9,493,197 B2 | 11/2016 | Logounov |
| 9,527,534 B2 | 12/2016 | Knobloch |
| 9,545,960 B2 | 1/2017 | Smith et al. |
| 9,789,916 B1 | 10/2017 | Beelman, III |
| 10,427,729 B2 | 10/2019 | Holden et al. |
| 2008/0303311 A1 | 12/2008 | Roush |
| 2009/0212594 A1 | 8/2009 | Breidenbach |
| 2011/0084516 A1 | 4/2011 | Smith |
| 2011/0109121 A1 | 5/2011 | Salari et al. |
| 2011/0272964 A1* | 11/2011 | Henderson ........... B62D 35/001 296/180.4 |
| 2013/0057020 A1 | 3/2013 | Burrell |
| 2013/0127203 A1* | 5/2013 | Johnson ................. B62D 35/02 296/180.4 |
| 2014/0125088 A1 | 5/2014 | Wiegel |
| 2015/0007436 A1 | 1/2015 | Kibler |
| 2015/0061318 A1 | 3/2015 | Kibler |
| 2015/0137501 A1* | 5/2015 | Kibler .................... B60R 3/005 280/837 |
| 2016/0339969 A1* | 11/2016 | Baker ................. B62D 35/001 |
| 2017/0029044 A1 | 2/2017 | Senatro |
| 2017/0129549 A1* | 5/2017 | Polgrean .................. B60T 7/18 |
| 2017/0240220 A1* | 8/2017 | Kron ......................... B60T 5/00 |
| 2017/0349224 A1* | 12/2017 | Logounov ............. B62D 63/08 |
| 2018/0362100 A1 | 12/2018 | Maiorana |
| 2019/0106162 A1* | 4/2019 | Holden ................ B62D 35/001 |
| 2019/0382058 A1* | 12/2019 | McQuilkin ............. B60P 3/226 |

OTHER PUBLICATIONS

Fleet Equipment, Investing in Aerodynamics to Improve Fuel Efficiency, Mar. 23, 2015, retrieved from http://www.fleetequipmentmag.com/truck-trailer-aerodynamics-fuel-effieicney/; see also http://www.slate.com/blogs/browbeat/2013/04/03/truck_panels_what_do_they_do_explained_photos.html; see also http://www.stemco.com/product/trailertail/.

* cited by examiner

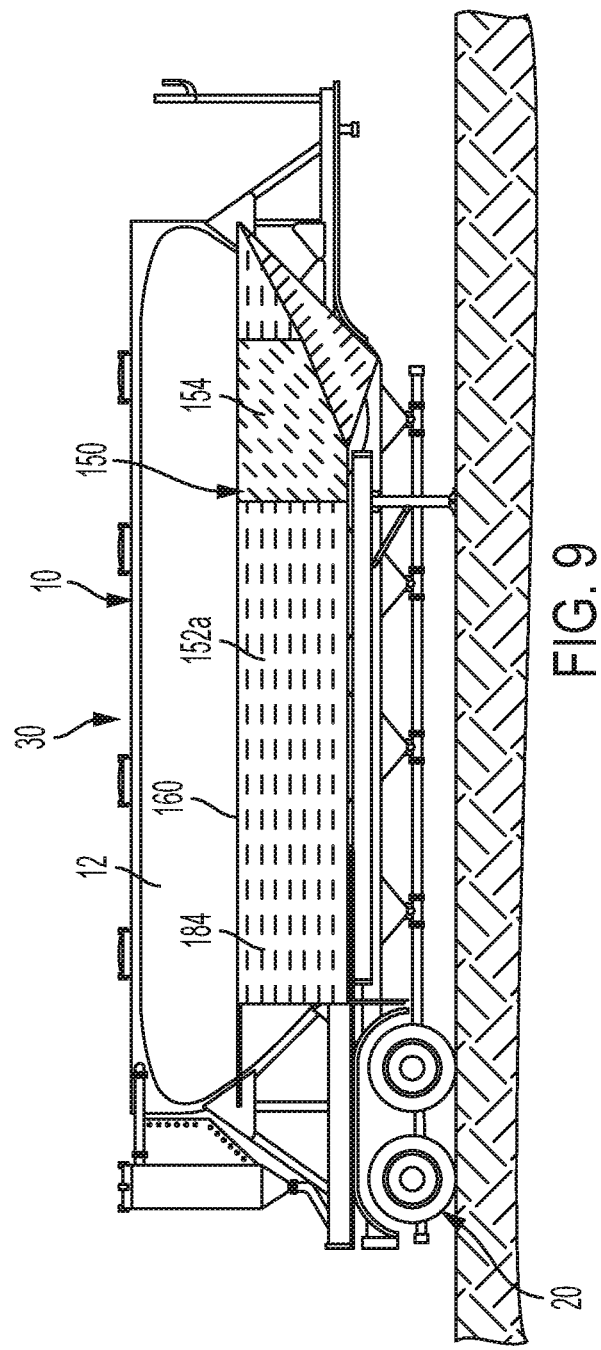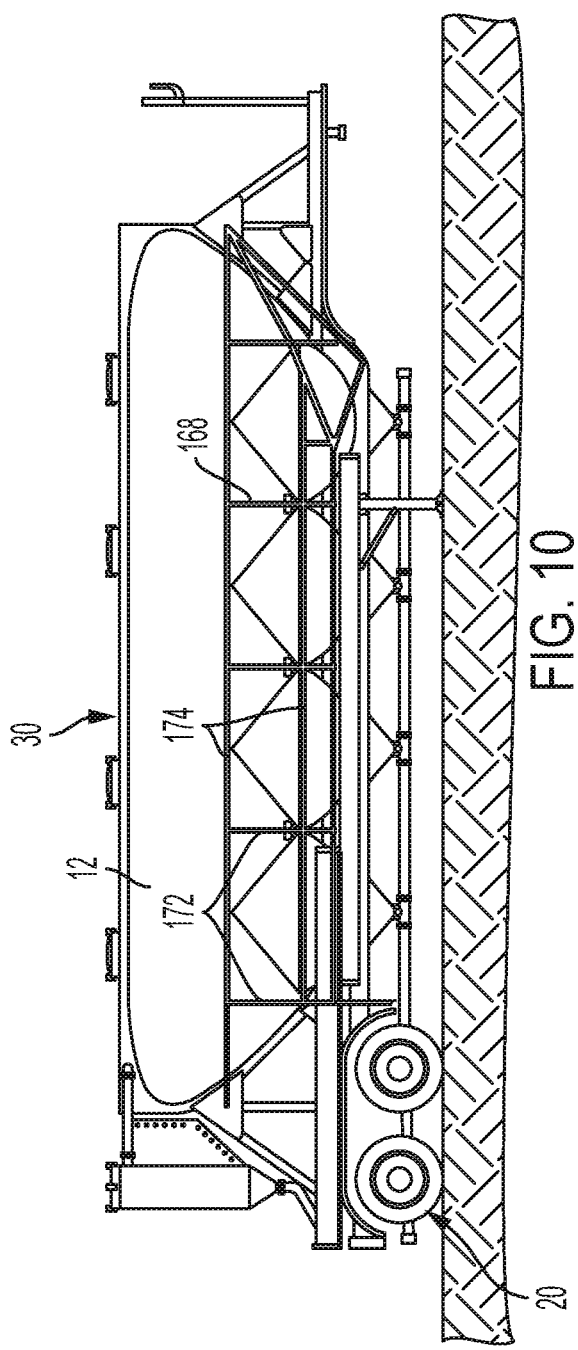

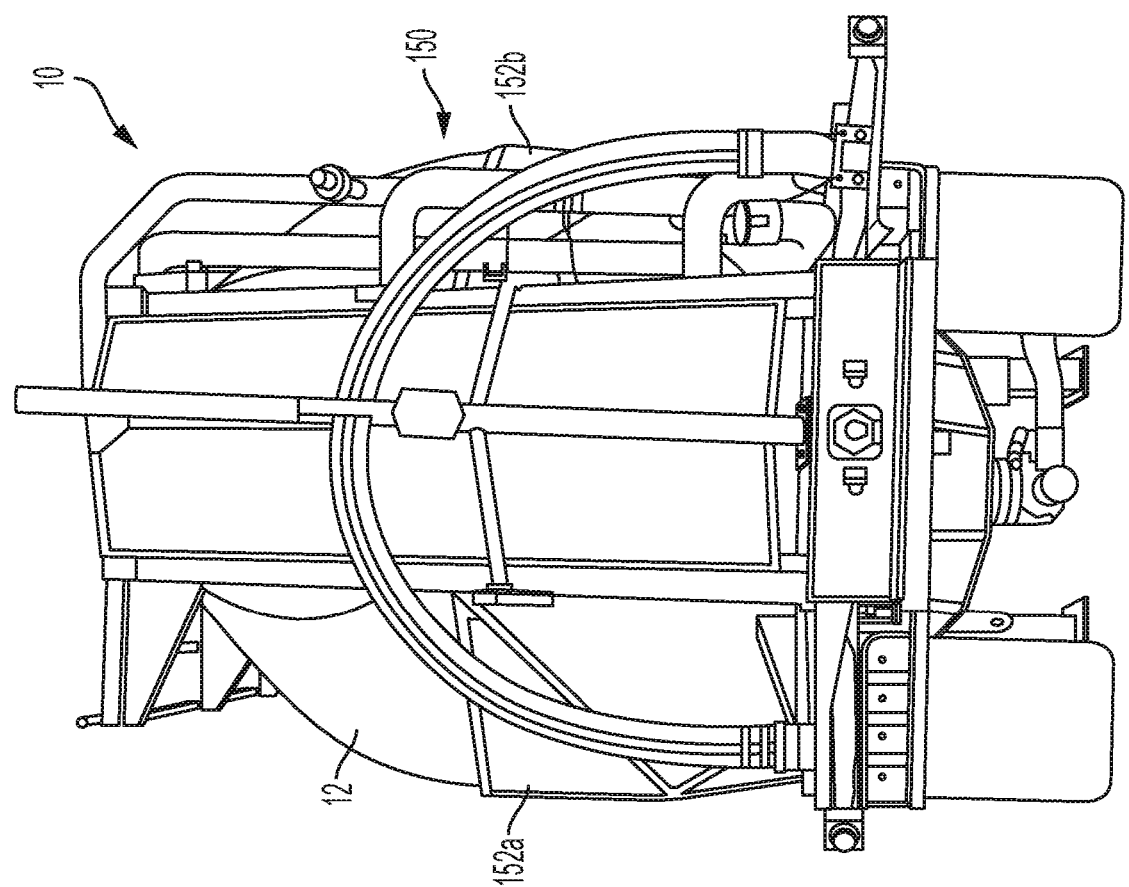

TANK TRAILER WRAP

CROSS-REFERENCE TO RELATED APPLICATIONS

The present application is a continuation of U.S. patent application Ser. No. 16/156,777, filed Oct. 10, 2018, which claims priority to U.S. Provisional Patent Application Ser. No. 62/570,335, filed Oct. 10, 2017, and U.S. Provisional Patent Application Ser. No. 62/645,790, filed Mar. 20, 2018, the disclosures of which are expressly incorporated herein by reference.

BACKGROUND AND SUMMARY OF THE DISCLOSURE

The present disclosure relates generally to an air deflector for a vehicle and, more particularly, to a wrap for promoting aerodynamics and preventing air drag on a conventional tank trailer.

Air or aerodynamic deflectors on vehicles, including trailers, are known to reduce wind drag and thereby increase fuel efficiency. While a variety of different aerodynamic deflectors have been used on cabs and conventional trailers to reduce air drag, there has been little effort directed specifically to improve the aerodynamics of tank trailers. More particularly, tank trailers typically include components and associated surfaces that increase air drag compared to other types of conventional trailers (e.g., flat bed trailers and enclosed trailers). For example, conventional tank trailers include a tank having a plurality of silos and associated piping components that increase air drag. As such, there remains a need for air deflectors that improve aerodynamics of tank trailers.

According to an illustrative embodiment of the present disclosure, an aerodynamic tank trailer wrap includes a first side assembly extending vertically between a first upper end and a first lower end, and a first upper coupler configured to couple the first upper end of the first side assembly to a first side of a tank trailer. The aerodynamic tank trailer wrap further includes a second side assembly extending vertically between a second upper end and a second lower end, and a second upper coupler configured to couple the second upper end of the second side assembly to a second side of the tank trailer. A lower attachment member extends below a tank of the tank trailer and couples together the first lower end of the first side assembly and the second lower end of the second side assembly.

According to another illustrative embodiment of the present disclosure, an aerodynamic tank trailer wrap includes an upper panel, and an upper coupler configured to support the upper panel for pivoting movement about an upper longitudinal pivot axis. The aerodynamic tank trailer wrap further includes a lower panel extending below the upper panel, and a lower coupler coupling the upper panel with the lower panel, the lower coupler supporting the lower panel for pivoting movement about a lower longitudinal pivot axis.

According to a further illustrative embodiment of the present disclosure, a tank trailer includes a frame, a tank supported by the frame, and a plurality of fixtures supported by the frame below the tank. An aerodynamic tank trailer wrap includes a first side assembly extending vertically between a first upper end and a first lower end, a first upper coupler configured to couple the first upper end of the first side assembly to a first side of the tank trailer. The aerodynamic tank trailer wrap further includes a second side assembly extending vertically between a second upper end and a second lower end, and a second upper coupler configured to couple the second upper end of the second side assembly to a second side of the tank trailer. A lower connecting member extends below the tank of the tank trailer and couples together the first lower end of the first side assembly and the second lower end of the second side assembly.

According to another illustrative embodiment of the present disclosure, an aerodynamic tank trailer wrap includes a first side assembly configured to be supported to a side of a tank trailer, the first side assembly including a first center portion extending between a first upper end and a first lower end, and between a front end and a rear end, the first side assembly further including a forward aerodynamic deflector supported by the front end of the center portion, and a rear wheel aerodynamic deflector supported by the rear end of the center portion. The aerodynamic tank trailer wrap further includes a second side assembly configured to be supported to a side of a tank trailer, the second side assembly positioned in laterally spaced relation to the first side assembly, the second side assembly including a second center portion extending between a second upper end and a second lower end, and between a front end and a rear end, the second side assembly further including a forward aerodynamic deflector supported by the front end of the center portion, and a rear wheel aerodynamic deflector supported by the rear end of the center portion. A forward aerodynamic nose deflector is positioned longitudinally forward of the front end of the first side assembly and the front end of the second side assembly, and is positioned laterally intermediate the first side assembly and the second side assembly.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 9 is a side elevational view of the illustrative aerodynamic tank wrap of FIG. 6;

FIG. 10 is a side elevational view of the support structure of the aerodynamic tank wrap of FIG. 9;

FIG. 11 is a front end view of the aerodynamic tank wrap of FIG. 6;

DETAILED DESCRIPTION OF THE DRAWINGS

Various embodiments of the invention described herein are not intended to be exhaustive or to limit the invention to precise forms disclosed. Rather, the embodiments selected for description have been chosen to enable one skilled in the art to practice the invention.

Figure 1:
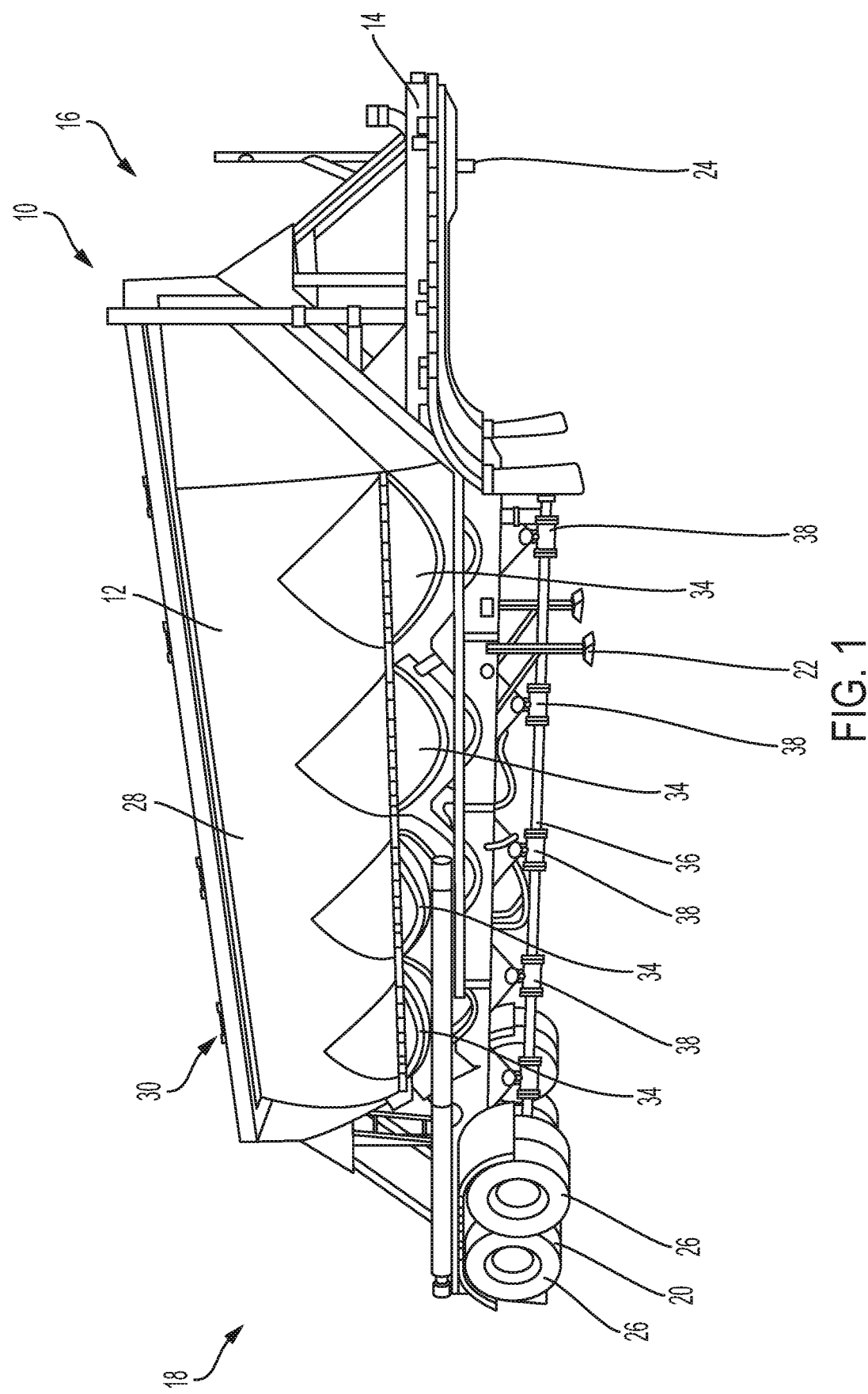
FIG. 1 is a side elevational view of a conventional tank trailer.
Figure 6:
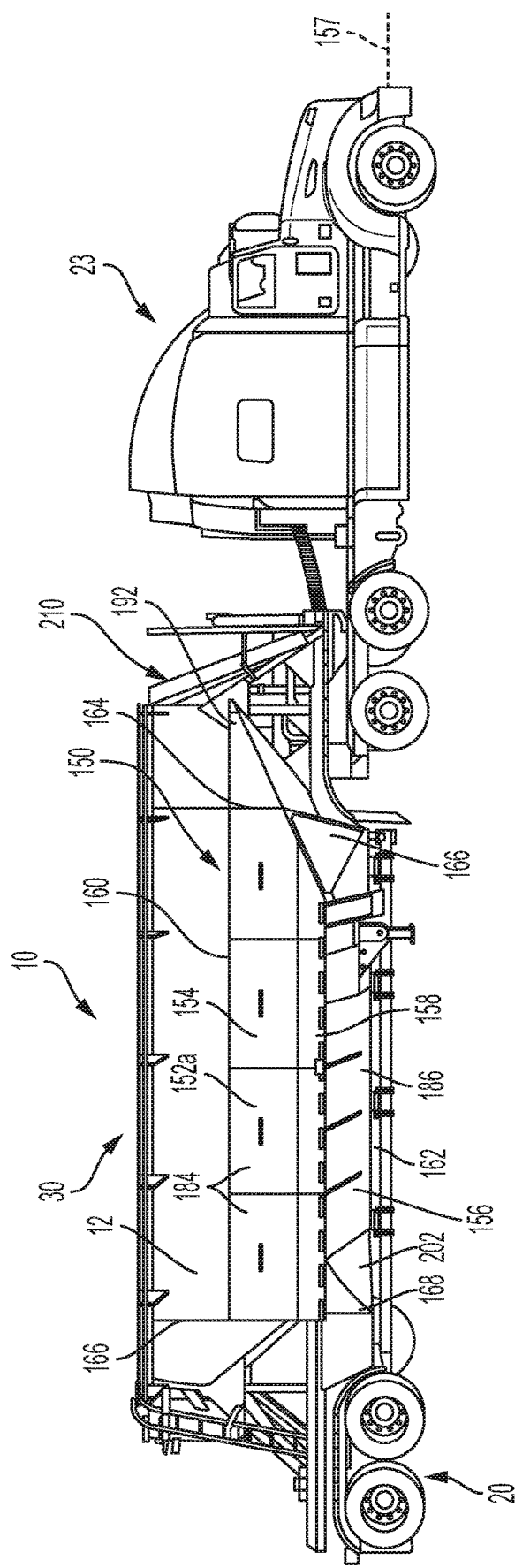
FIG. 6 is a perspective view of a further illustrative aerodynamic tank wrap of the present disclosure coupled to a conventional tank trailer.

Referring initially to FIG. 1, a conventional tank trailer 10 illustratively includes a tank or hopper 12 supported by a frame 14. The frame 14 extends longitudinally between a front end 16 and a rear end 18. A rear suspension 20 supports the rear end 18 of the frame 14, and a retractable landing gear or dolly leg 22 may support the front end 16 of the frame 14 when the tank trailer 10 is uncoupled from a pulling vehicle, illustratively a tractor cab 23 (FIG. 6). A conventional receiver 24 is positioned proximate the front end 16 of the frame 14 and is configured to receive a hitch of the pulling vehicle. The rear suspension 20 illustratively includes a plurality of wheels 26.

Figure 5:
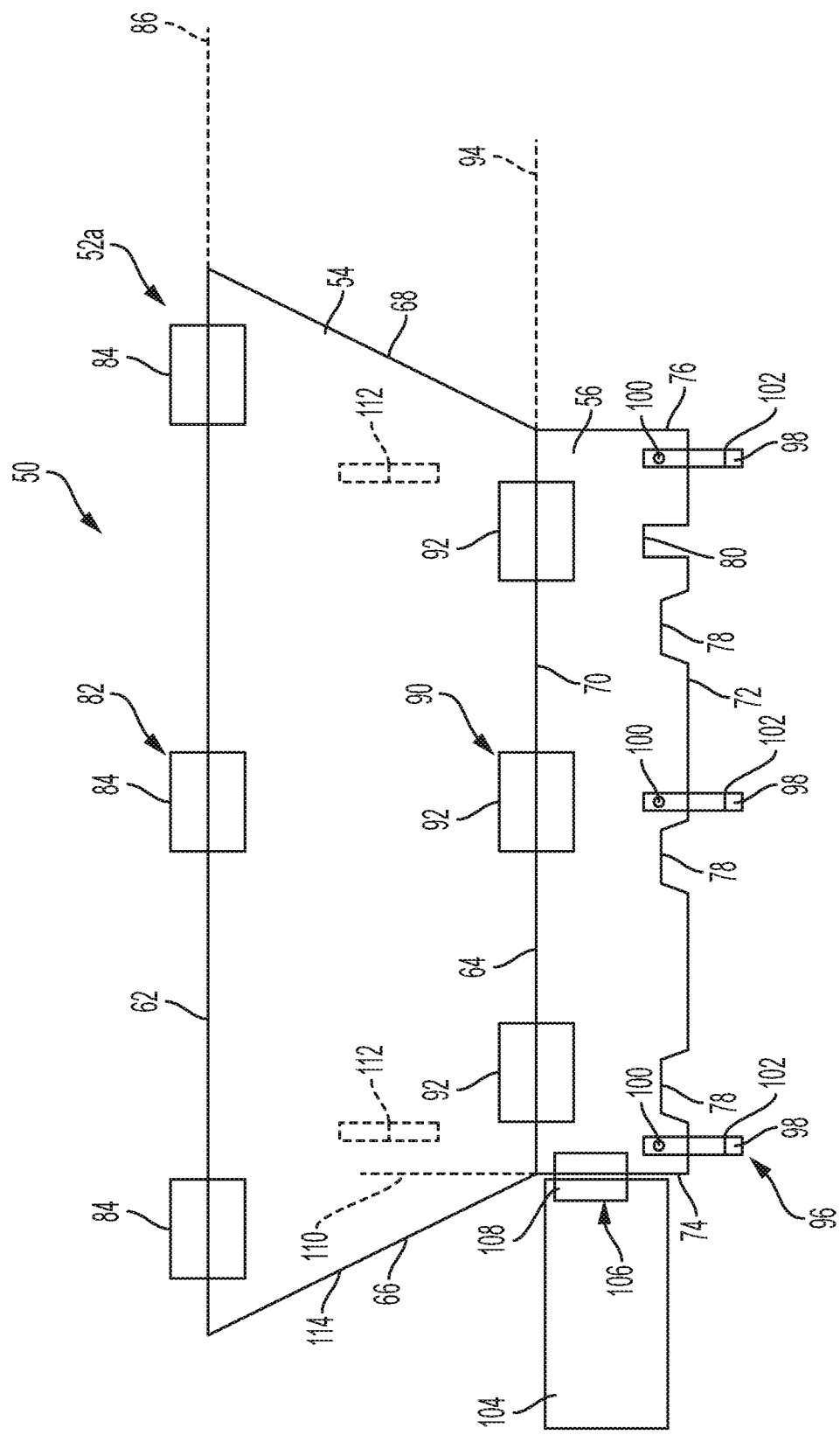
FIG. 5 is a side view of a side assembly of the illustrative aerodynamic tank wrap of FIG. 2.

The tank 12 illustratively includes a substantially cylindrically shaped main body 28 and includes a first side 30 and a second side 32 (FIGS. 1 and 5). The tank 12 is illustratively of conventional design and is configured to receive a fluid or granular material. A plurality of silos 34 couple the main body 28 to piping 36. The piping 36 extends below the frame 14 and is operably coupled to the tank 12 to deliver material therefrom. A plurality of fixtures 38 (illustratively valves or knuckles) are supported below each silo 34 and fluidly coupled to the piping 36. A control panel (not shown) may be supported by the frame 14 and is operably coupled to the fixtures 38.

With reference to FIGS. 2-5, an illustrative aerodynamic tank trailer wrap 50 includes first and second side assemblies 52a and 52b that extend longitudinally along opposing sides 30 and 32 of the tank trailer 10. Each of the side assemblies 52a and 52b are substantially identical. As such, while the following description will focus on the first side assembly 52a, it should be appreciated that the second side assembly 52b includes substantially similar components.

Figure 2:
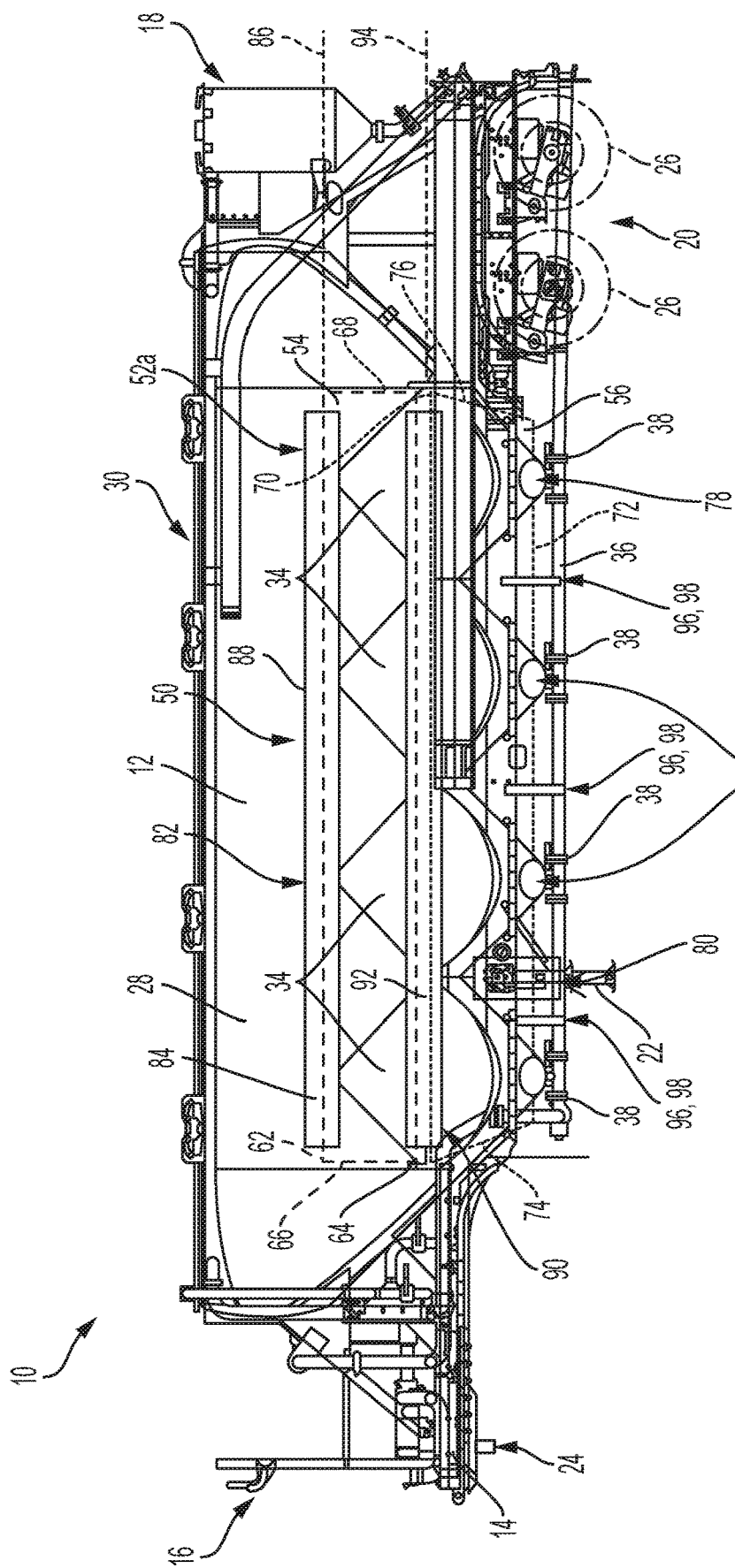
FIG. 2 is a side elevational view of the tank trailer of FIG. 1, showing an illustrative aerodynamic tank wrap of the present disclosure coupled thereto.
Figure 3:
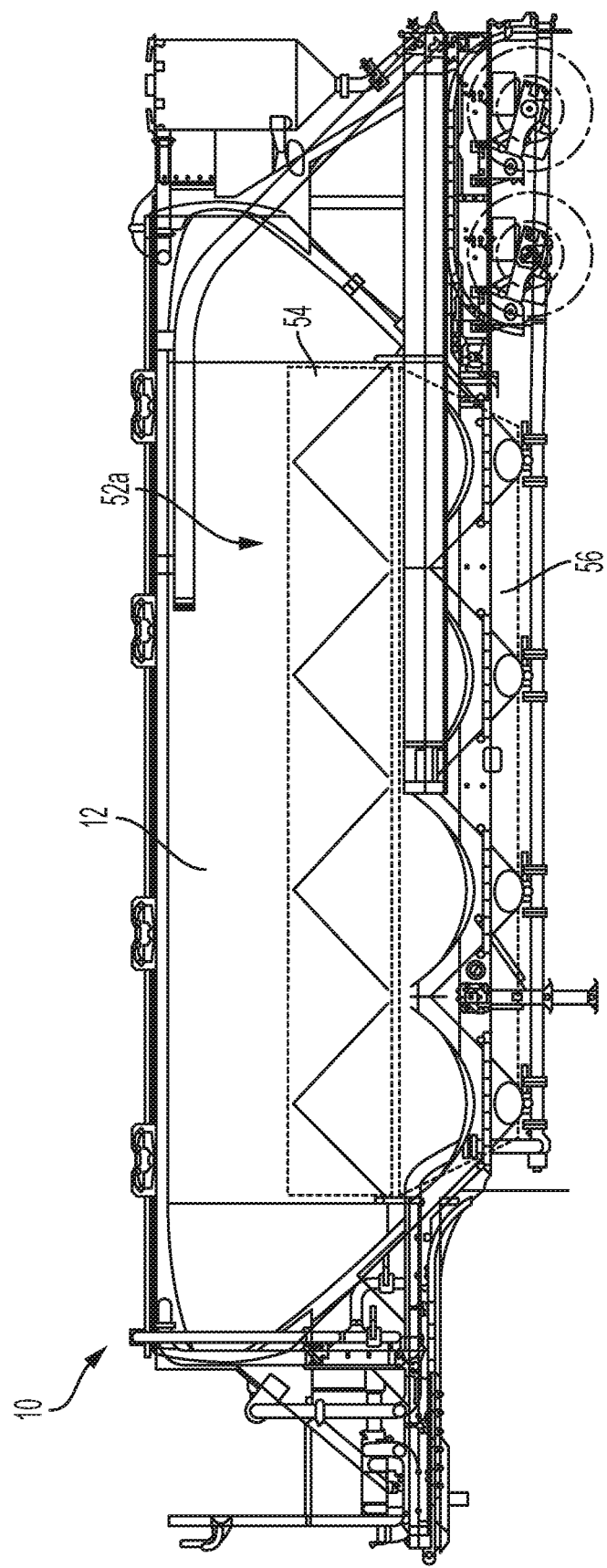
FIG. 3 is another side elevational view of the illustrative aerodynamic tank wrap similar to FIG. 2.
Figure 4:
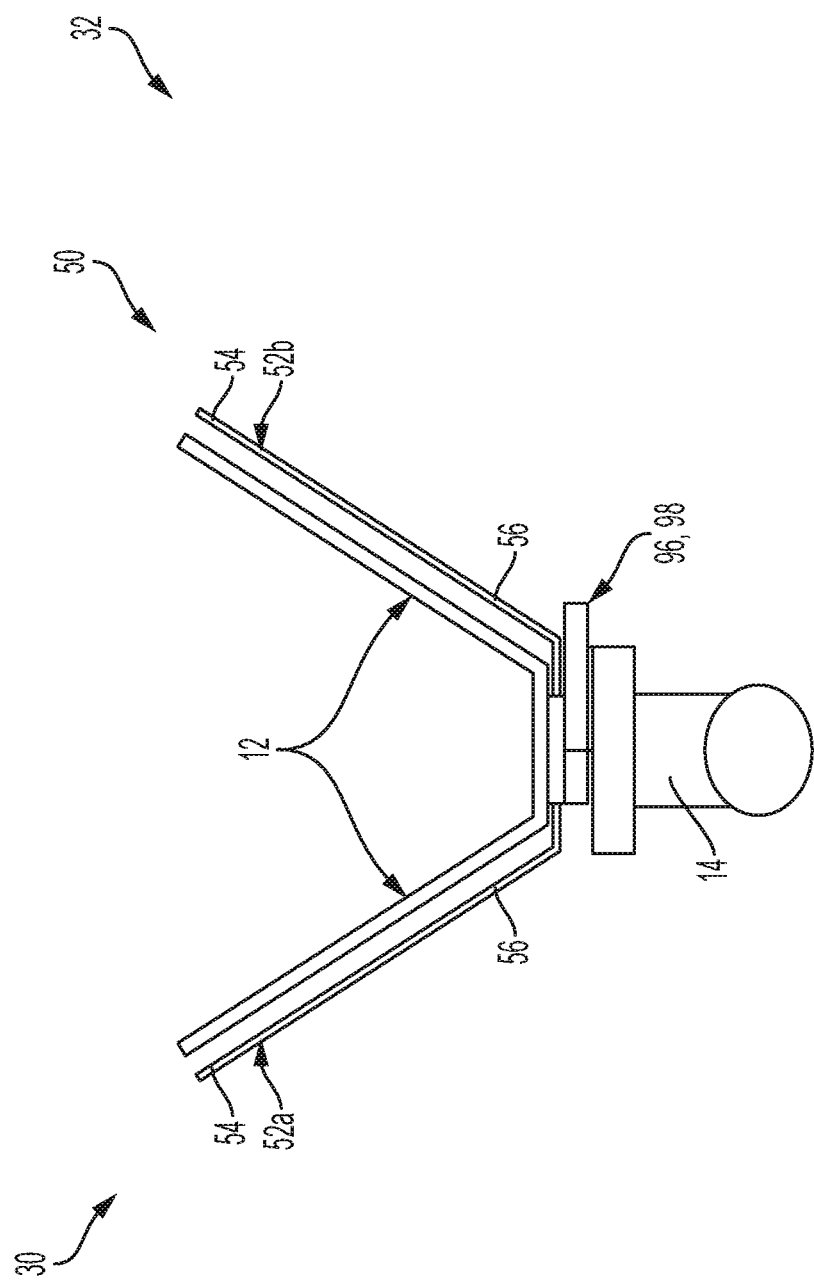
FIG. 4 is an end view of the tank trailer and illustrative aerodynamic tank wrap of FIG. 2.

With further reference to FIGS. 2, 4 and 5, each side assembly 52 illustratively includes an upper portion or panel 54 and a lower portion or panel 56 extending vertically between an upper end 58 and a lower end 60. Each panel 54 and 56 may be formed of a polymer, such as a fiberglass reinforced plastic (frp). In one illustrative embodiment, each panel 54 and 56 is illustratively formed of translucent Kemlite, available from Crane Composites Inc. of Channahon, Ill.

The upper panel 54 illustratively includes an upper edge 62, a lower edge 64, a first side edge 66 and a second side edge 68. Illustratively, the side edges 66 and 68 extend substantially parallel to each other in a vertical direction. In the illustrative embodiment of FIG. 5, the first and second side edges 66 and 68 taper inwardly from the upper edge 62 toward the lower edge 64.

The lower panel 56 illustratively includes an upper edge 70, a lower edge 72, a first side edge 74 and a second side edge 76. Illustratively, the side edges 74 and 76 extend substantially parallel to each other in a vertical direction. In the illustrative embodiment of FIG. 2, the first and second side edges 74 and 76 taper inwardly from the upper edge 70 toward the lower edge 72. The lower edge 72 illustratively includes a plurality of knuckle openings or cut-outs 78 to receive the valves 38, and a landing gear opening or cut-out 80 to receive the landing gear 22.

An upper coupler 82 illustratively couples the upper edge 62 of the upper panel 54 proximate a vertical mid-point of the tank 12. The upper coupler 82 illustratively includes at least one upper hinge 84 to support the upper panel 54 for pivoting movement about an upper longitudinal pivot axis 86. A top support channel 88 may be secured (e.g., via welding) to the tank trailer 10 to support the upper hinge 84. A lower coupler 90 illustratively couples the upper edge 70 of the lower panel 56 to the lower edge 64 of the upper panel 54. The lower coupler 90 illustratively includes at least one lower hinge 92 to support the lower panel 56 for pivoting movement about a lower longitudinal pivot axis 94. The upper and lower hinges 84 and 92 may comprise double reinforced hinges.

The upper panel 54 extends up from the lower panel 56 which, in turn, extends or wraps under the belly of the tank trailer 10 to enclose exposed components. More particularly, the lower panels 56 cover the lower portions of the silos 34, the piping 30, and the valves 38. As such, the side assemblies 52a and 52b direct airflow away from these components, thereby improving aerodynamics of the tank trailer 10.

At least one lower connecting member 96 couples together the lower panels 56 of the opposing side assemblies 52a and 52b. Illustratively, the lower connecting members 96 comprise a plurality of rubber straps or bands 98. A fastener 100 illustratively permanently secures a first end of each strap 98 to the lower edge 72 of the lower panel 56 of first side assembly 52a, while a fastener clip 102 releasably secures a second end of the strap 98 to the lower edge 72 of the lower panel 56 of second side assembly 52b (FIG. 5).

With further reference to FIG. 5, a rear wing 104 illustratively extends rearwardly at a lateral angle from each lower panel 56 to deflect air from the rear suspension 20. A coupler 106, illustratively a hinge 108, couples the rear wing 104 to the lower panel 56 such that the lateral angle of the rear wing 104 may be adjusted about a vertical axis 110. Supports or kickstands 112, illustratively telescoping legs, may be pivotably supported by an inner surface 114 of the upper panel 54 to support the side assembly 52 in a raised position such that an operator may access the components below the tank 12.

Referring now to FIGS. 6-32, a further illustrative aerodynamic tank trailer wrap 150 is shown as including many similar features as the tank trailer wrap 50 detailed above. As such, in the following description, similar components will be identified with like reference numbers.

With reference to FIGS. 6-11, the illustrative aerodynamic tank trailer wrap 150 includes first and second side assemblies 152a and 152b that extend longitudinally along opposing sides 30 and 32 of the tank trailer 10. Each of the side assemblies 152a and 152b are substantially identical. As such, while the following description will focus on the first side assembly 152a, it should be appreciated that the second side assembly 152b includes substantially similar components.

Each side assembly 152 illustratively includes an upper portion 154 and a lower portion 156. The upper portion 154 extends substantially vertical in parallel relation to the side 30, 32 of the tank 12. The lower portion 156 is angled inwardly toward a center (e.g., a longitudinal center axis 157) of the trailer 10 below the tank 12. An upper end of the lower portion 156 may be coupled to a lower end of the upper portion 154 via a pivot coupling, similar to the hinge 92 as detailed above. Each side assembly 152 illustratively includes a center portion 158 extending between opposing upper and lower ends 160 and 162, and between opposing front and rear ends 164 and 166.

Figure 13:
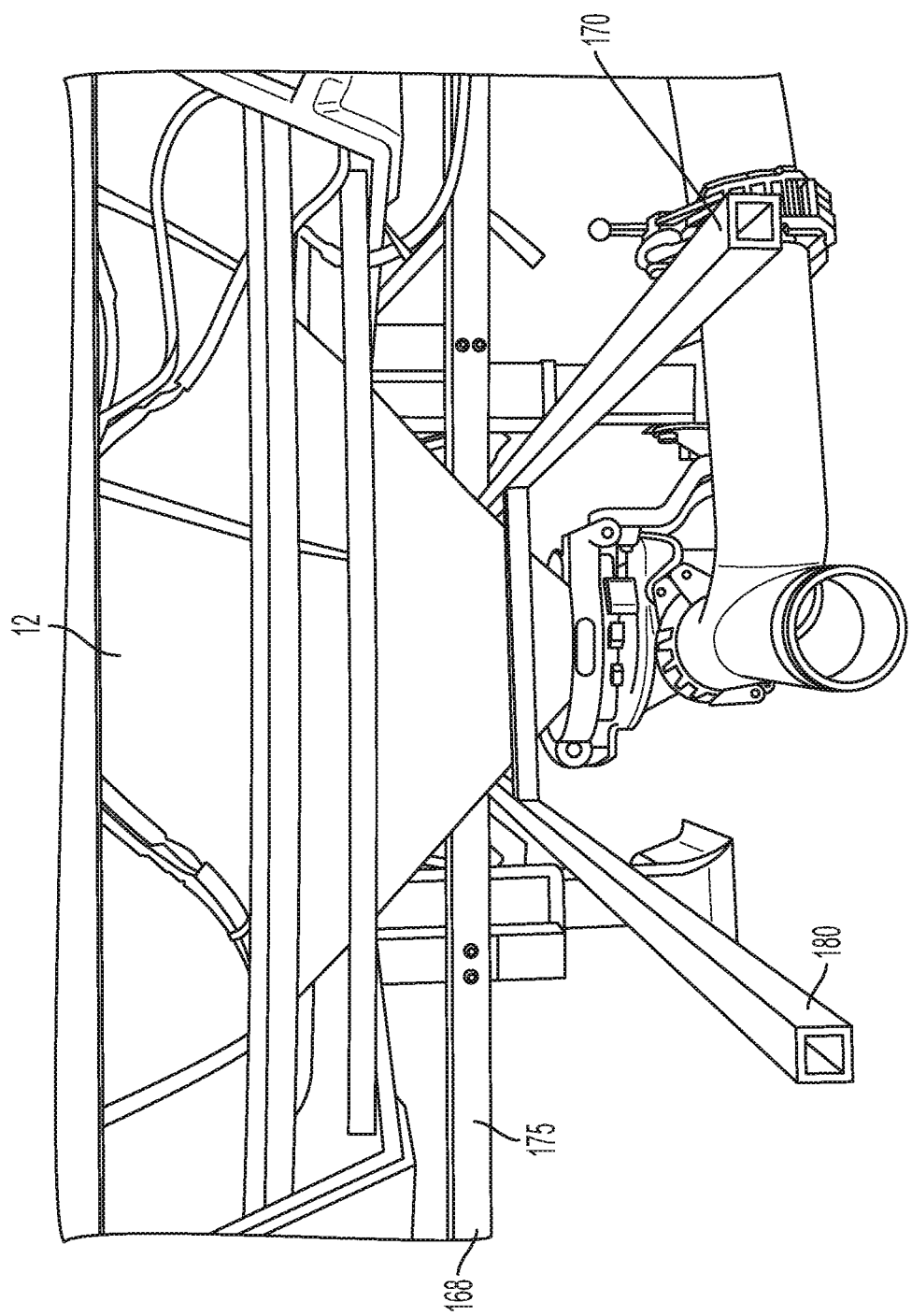
FIG. 13 is a front perspective view of a lower portion of the support structure of FIG. 10.
Figure 14:
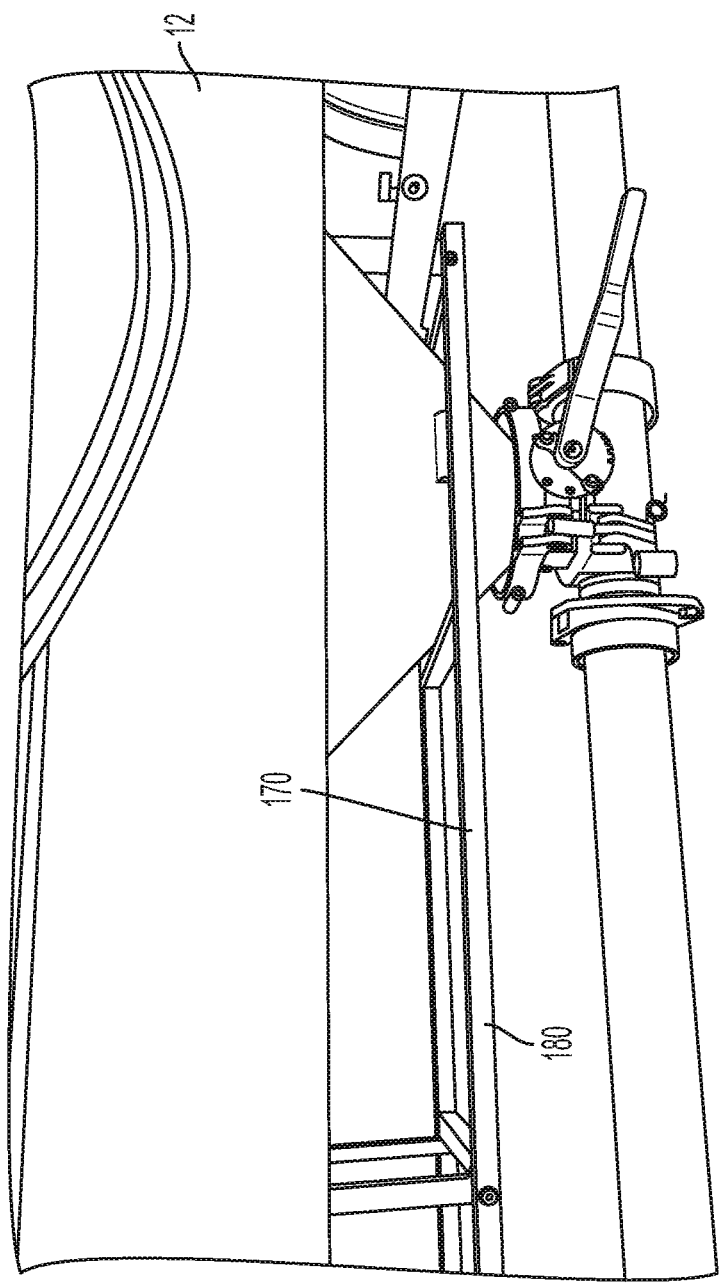
FIG. 14 is a side perspective view of the lower portion of the support structure of FIG. 10.
Figure 15:
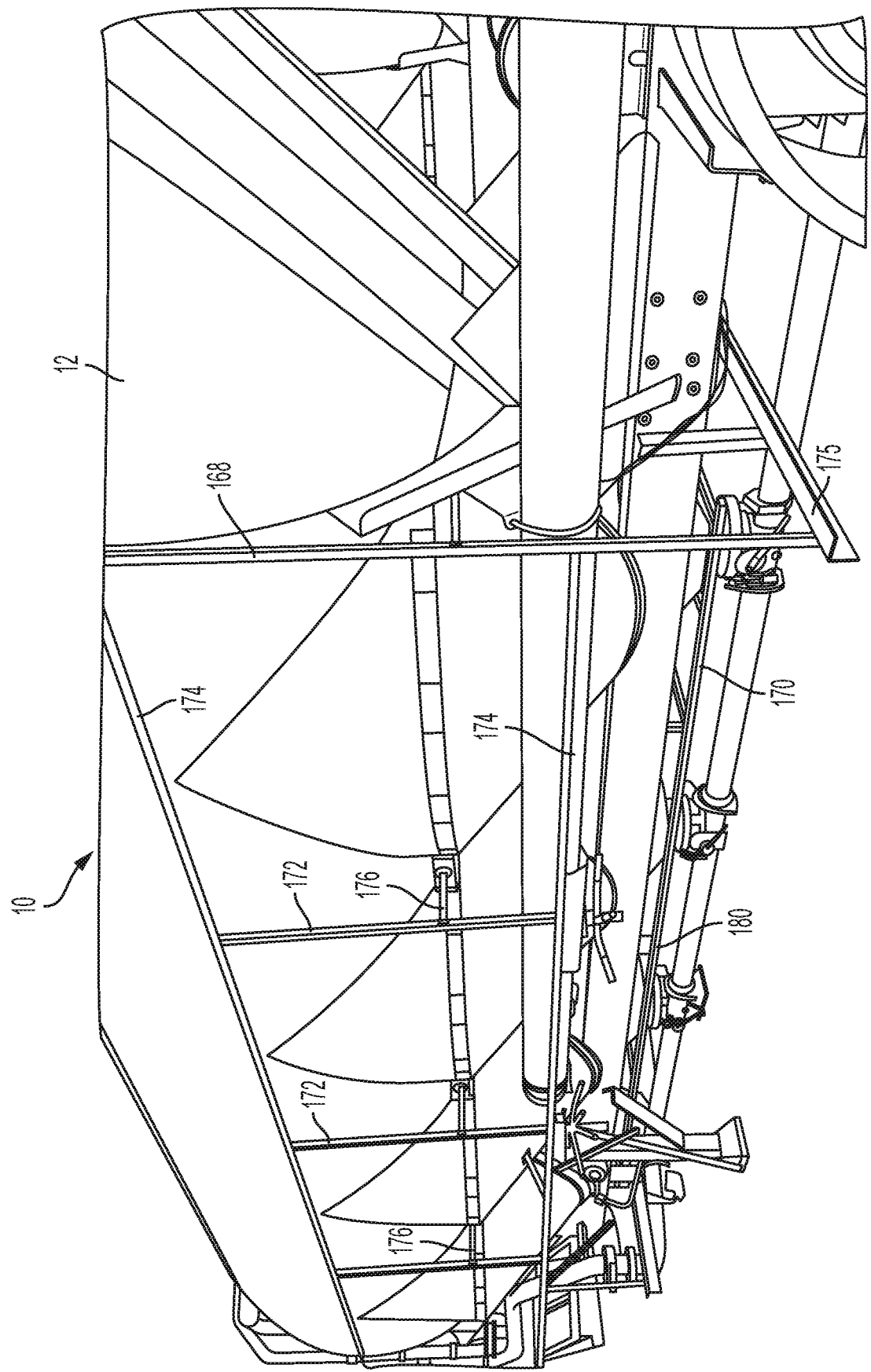
FIG. 15 is a side perspective view of the upper portion of the support structure of FIG. 10.
Figure 16:
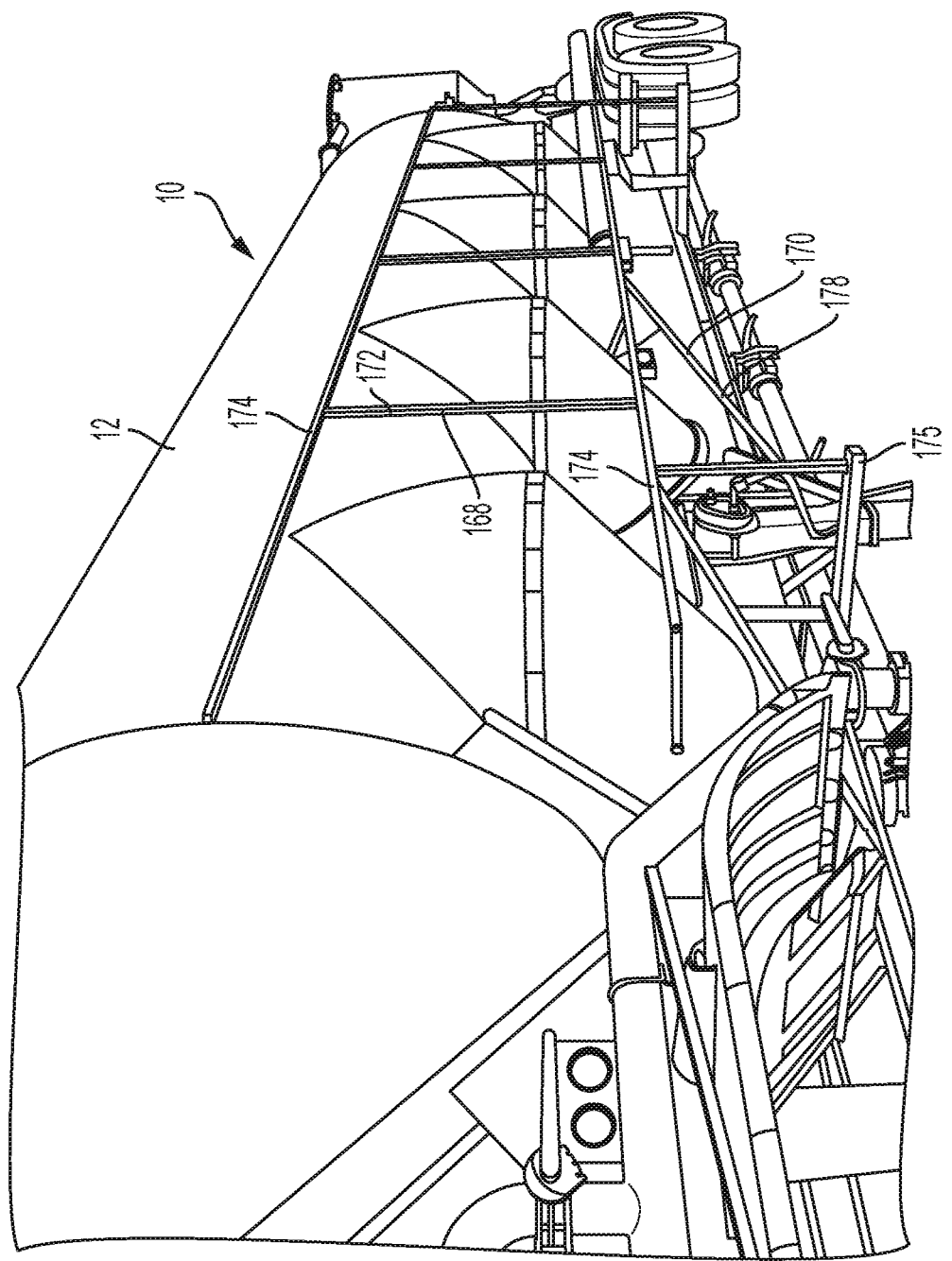
FIG. 16 is another side perspective view of the upper portion of the support structure of FIG. 10.
Figure 21:
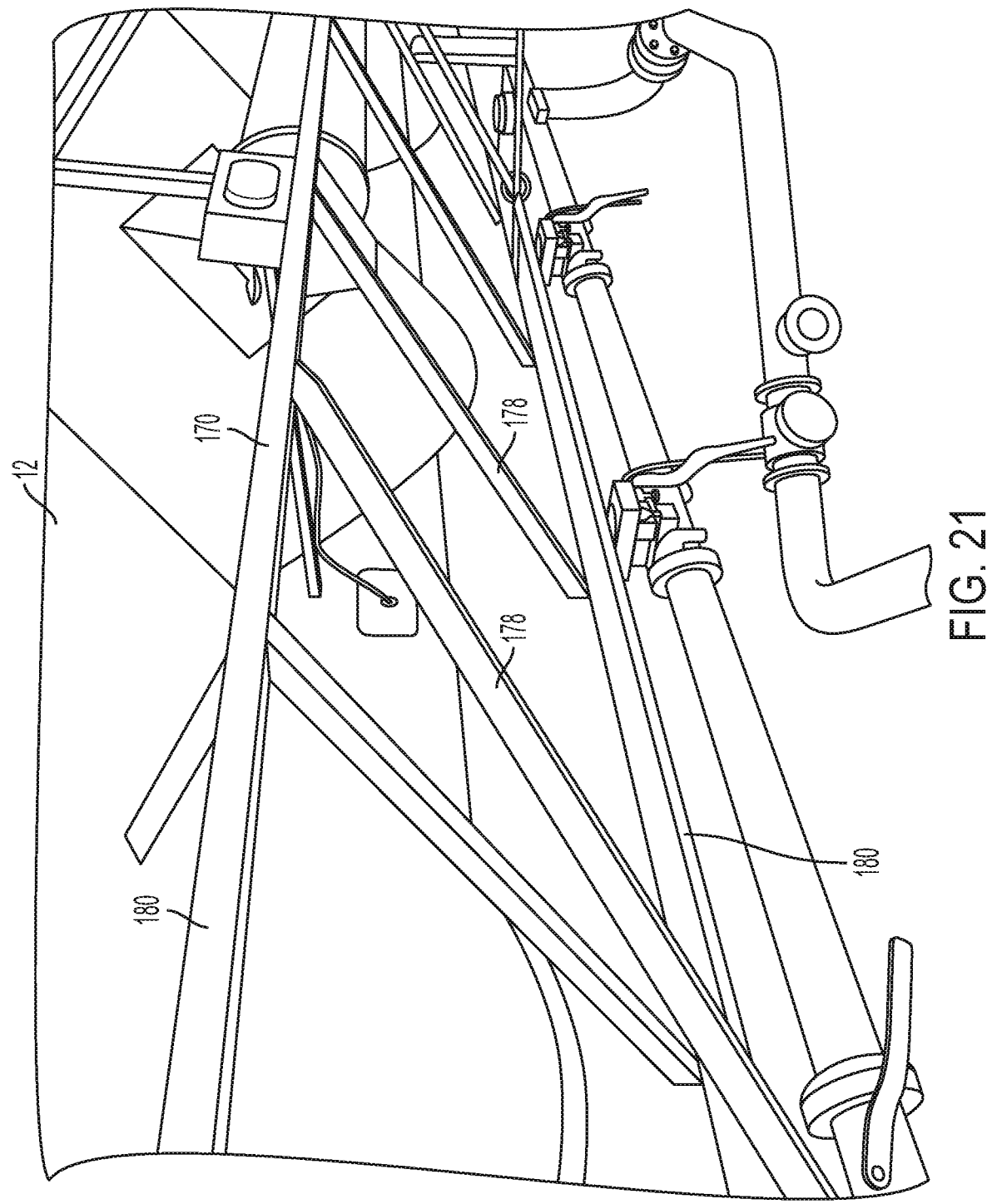
FIG. 21 is a side perspective view of a lower portion of the support structure of FIG. 10.
Figure 22:
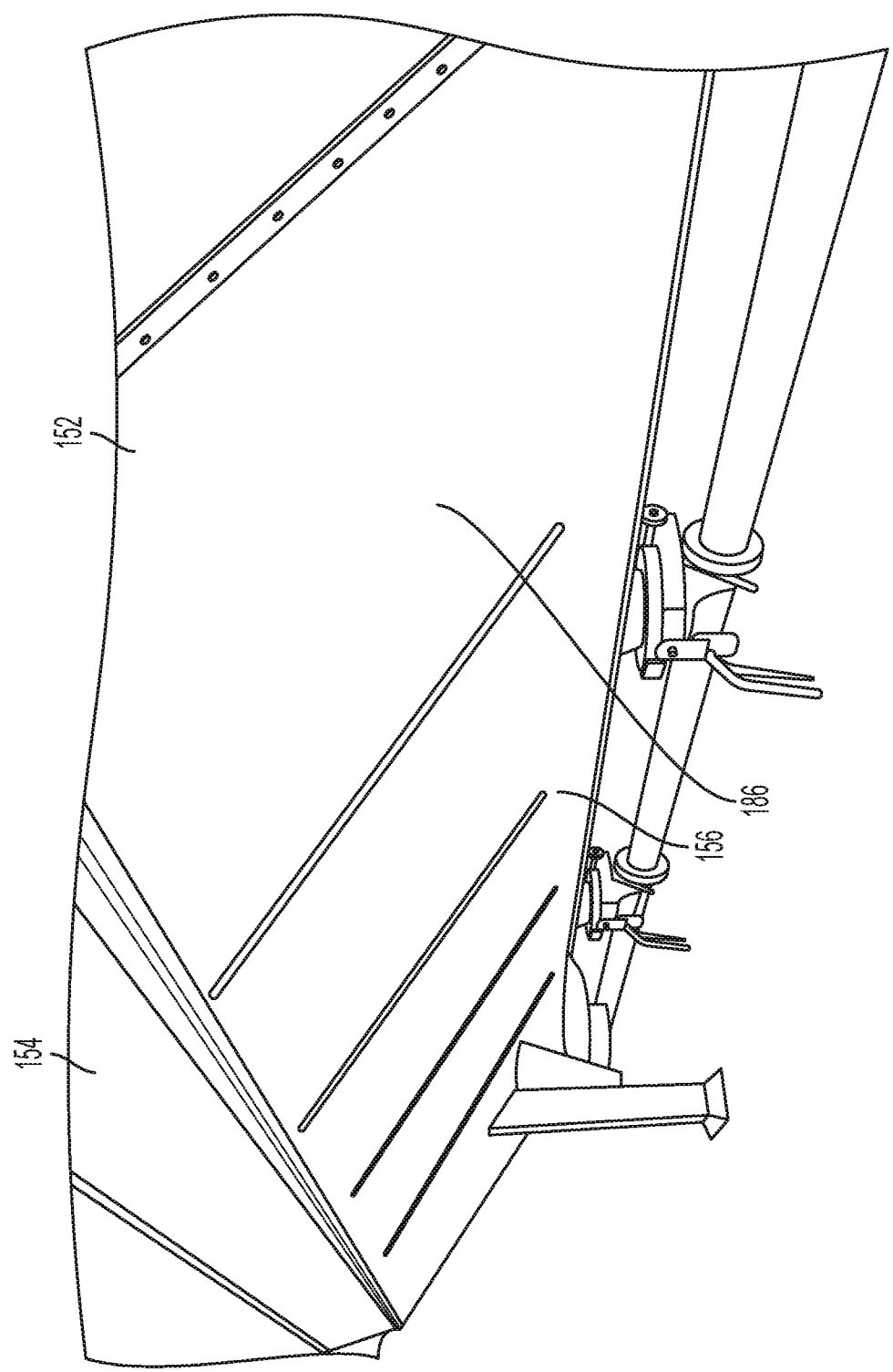
FIG. 22 is a side perspective view showing aerodynamic panels coupled to the lower portion of the support structure of FIG. 21.

With reference to FIGS. 10, 13-16, 19, 20, 24, 25, 31 and 32, the upper portion 154 and the lower portion 156 of each side assembly 152 illustratively includes a support structure or framework 168 and 170, respectively. The framework 168 and 170 are illustratively formed of a plurality of interconnected rigid structural supports, such as aluminum tubes. More particularly, the framework 168 of the upper portion 154 illustratively includes a plurality of uprights 172 coupled (e.g., via welding) to longitudinal cross-members 174. Lateral cross-members or couplers 175 may extend below the tank 12 between the side assemblies 152a and 152b (FIGS. 13 and 15). Brackets 176 may be welded to the tank 12 to secure the framework 168 to the tank trailer 10. Similarly, the framework 170 of the lower portion 156 illustratively includes a plurality of inwardly angled members or uprights 178 coupled (e.g., via welding) to longitudinal cross-members 180 (FIG. 21). Lateral supports 182 may be welded to the tank trailer 10 to secure the framework 170 thereto.

Figure 12:
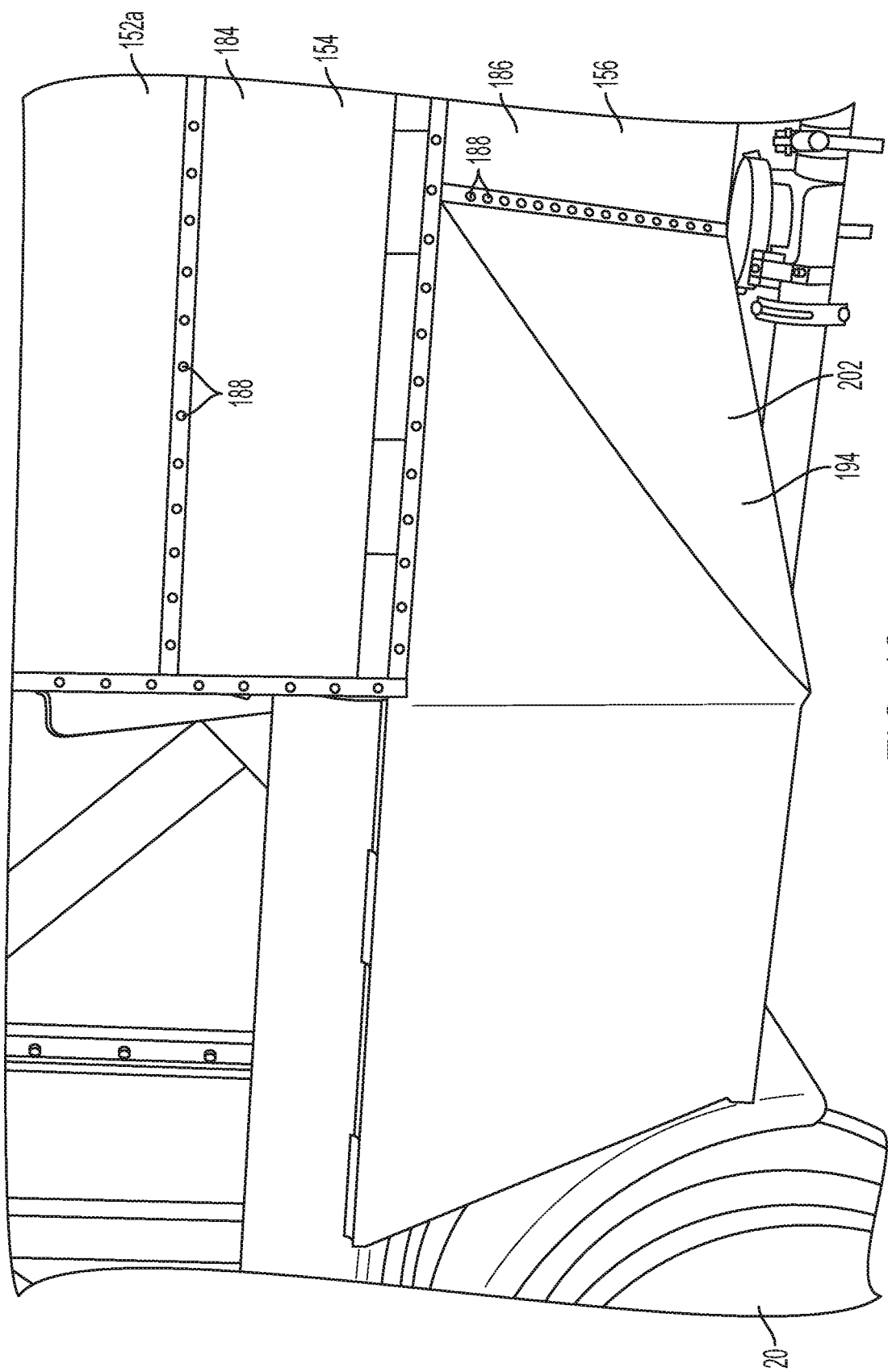
FIG. 12 is a perspective view of a rear wheel deflector of the aerodynamic tank wrap of FIG. 6.

Aerodynamic panels 184 and 186 are illustratively coupled to the framework 168 and 170, respectively. The panels 184 and 186 may be formed of a polymer, such as a fiberglass reinforced plastic (frp), coupled to the framework 168 and 170 via conventional fasteners, such as screws 188 (FIG. 12). In one illustrative embodiment, the panels 184 and 186 are illustratively formed of ArmorTuf®-NXT High Impact Liner having a thickness of 0.065 inches, available from Crane Composites Inc. of Channahon, Ill.

Figure 19:
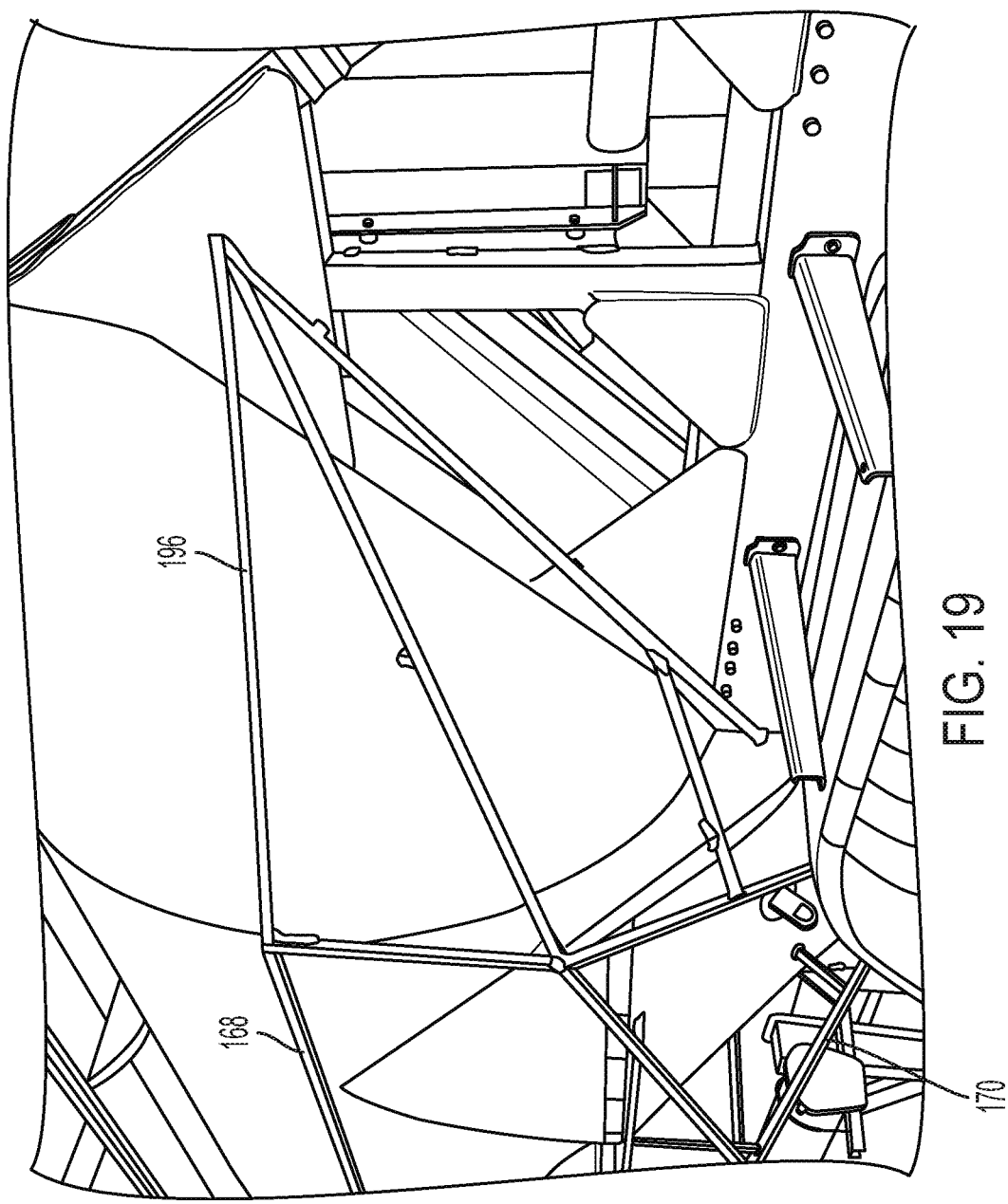
FIG. 19 is a front perspective view of the right side of the support structure of FIG. 10.
Figure 20:
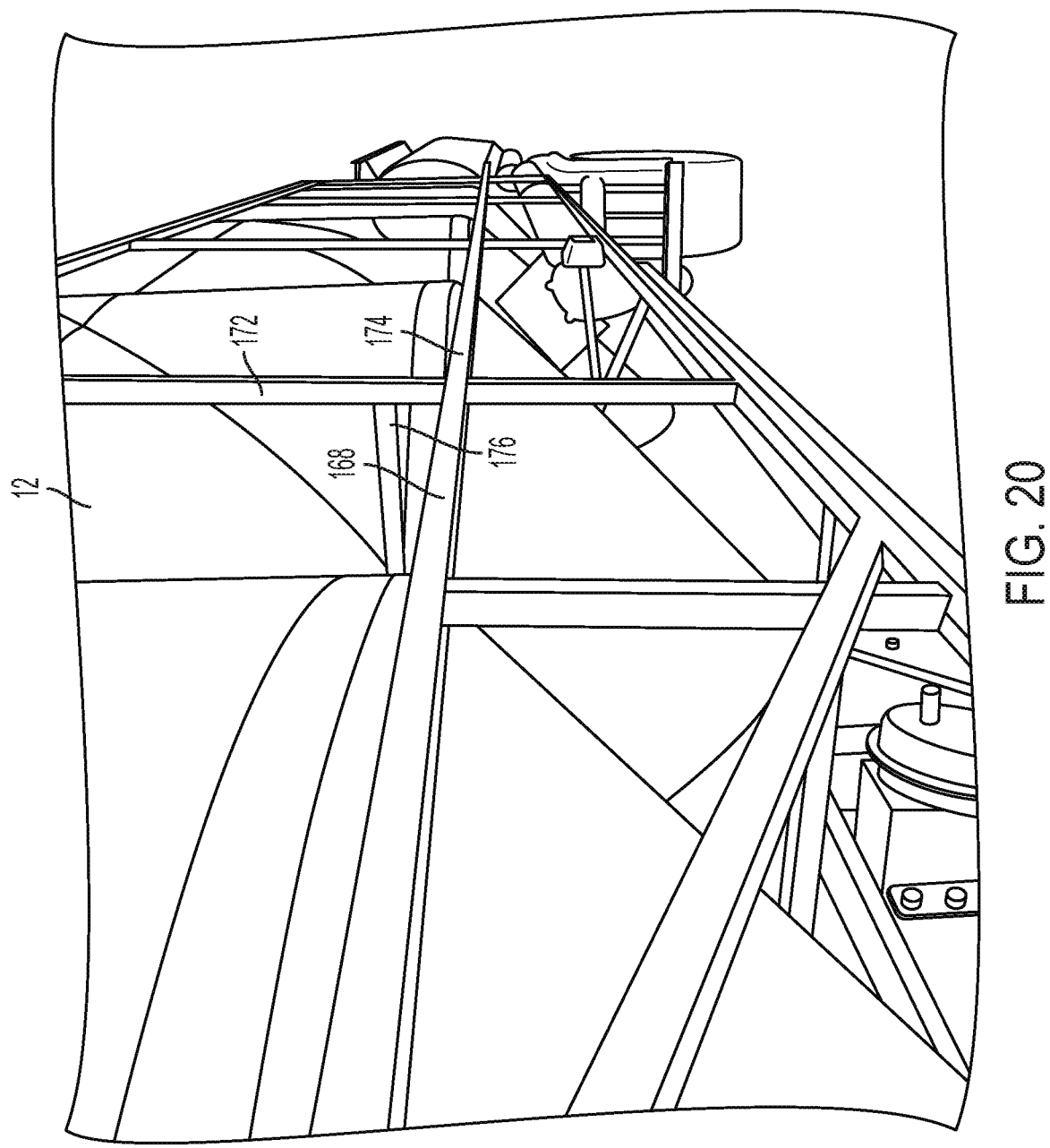
FIG. 20 is a side perspective view of an upper portion of the support structure of FIG. 10.
Figure 23:
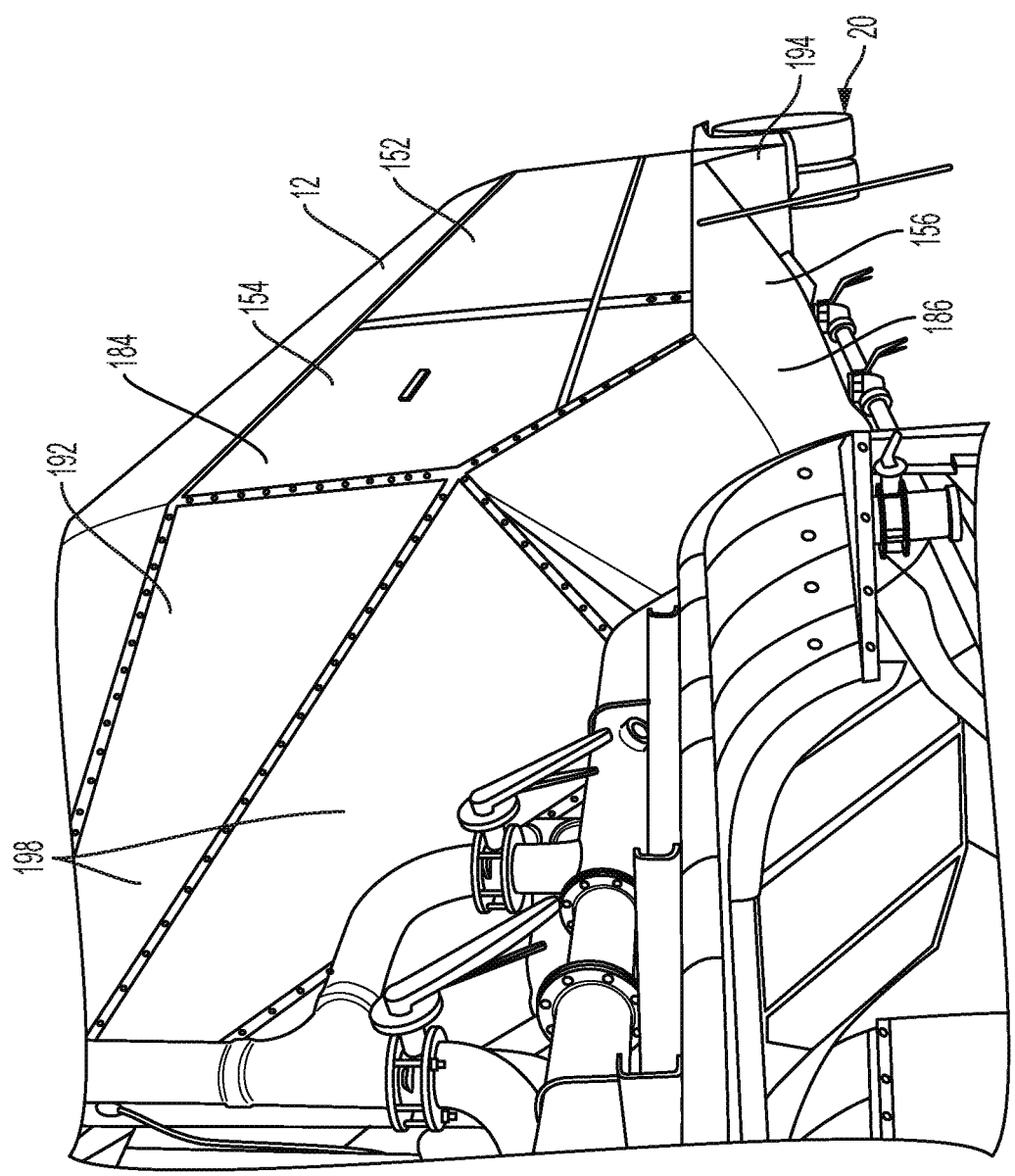
FIG. 23 is a side perspective view of aerodynamic panels coupled to the upper portion of the support structure of FIG. 16.
Figure 24:
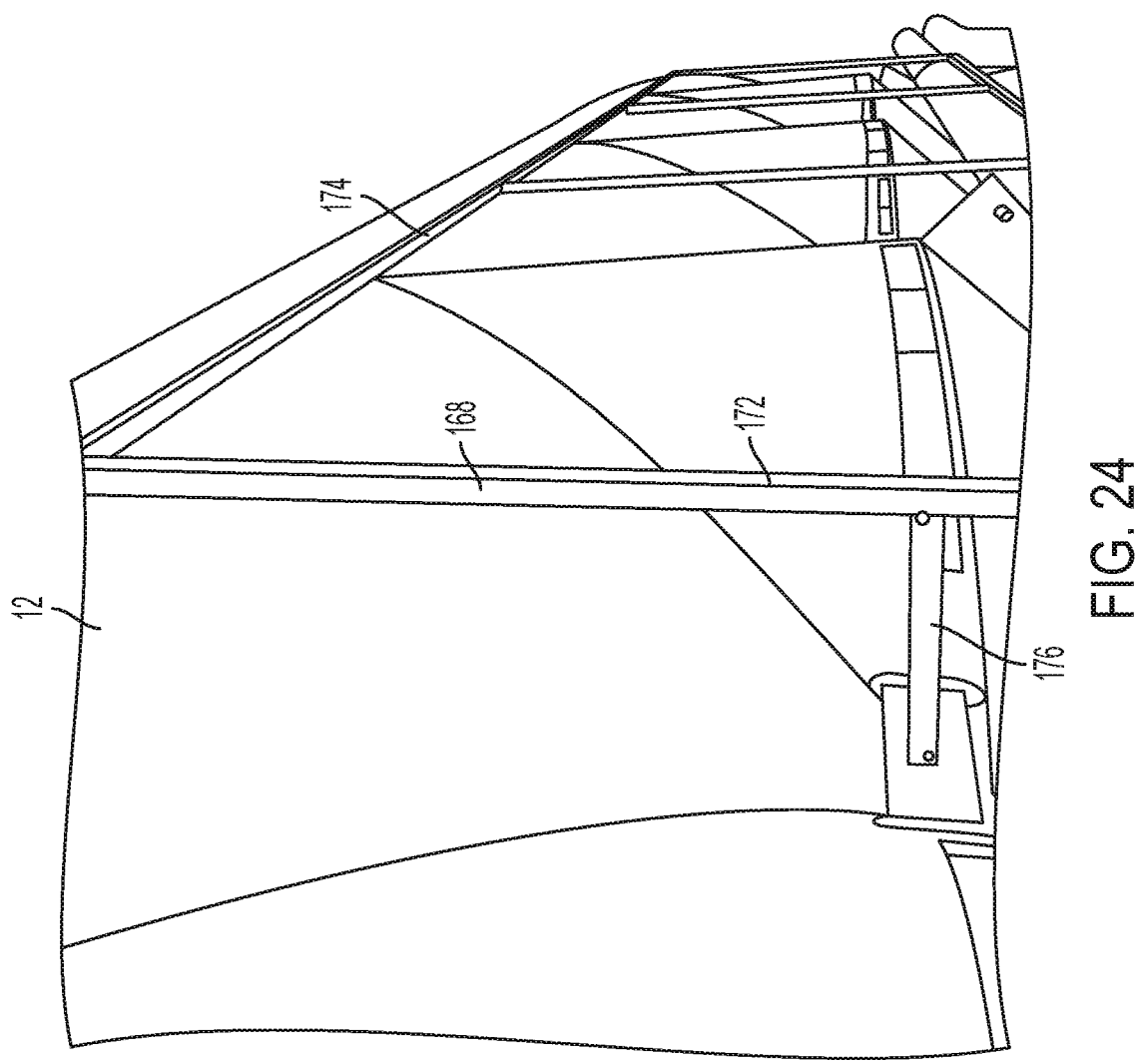
FIG. 24 is a side perspective view of aerodynamic panels coupled to the upper portion of the support structure of FIG. 10.
Figure 25:
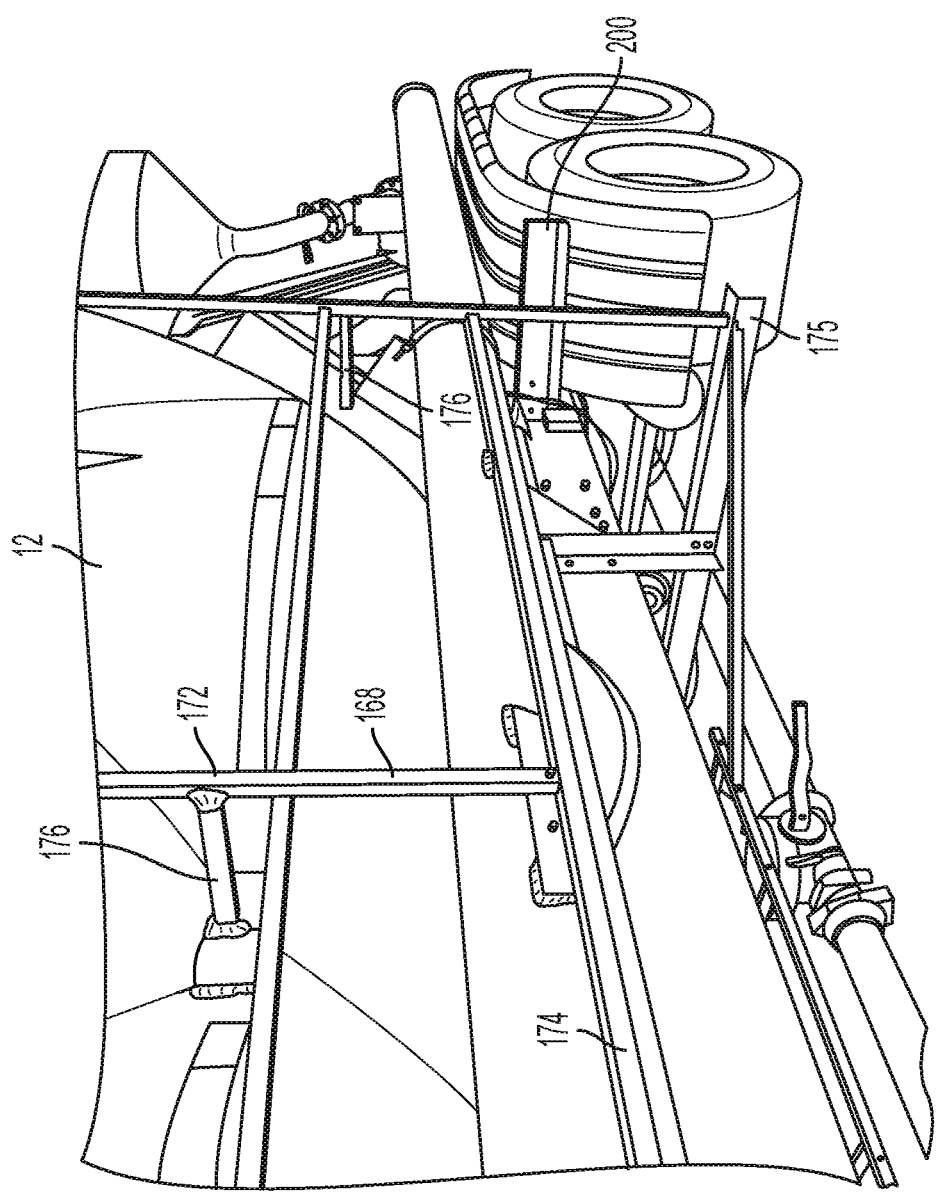
FIG. 25 is a front perspective view of the support structure of the rear wheel deflector of FIG. 12.
Figure 26:
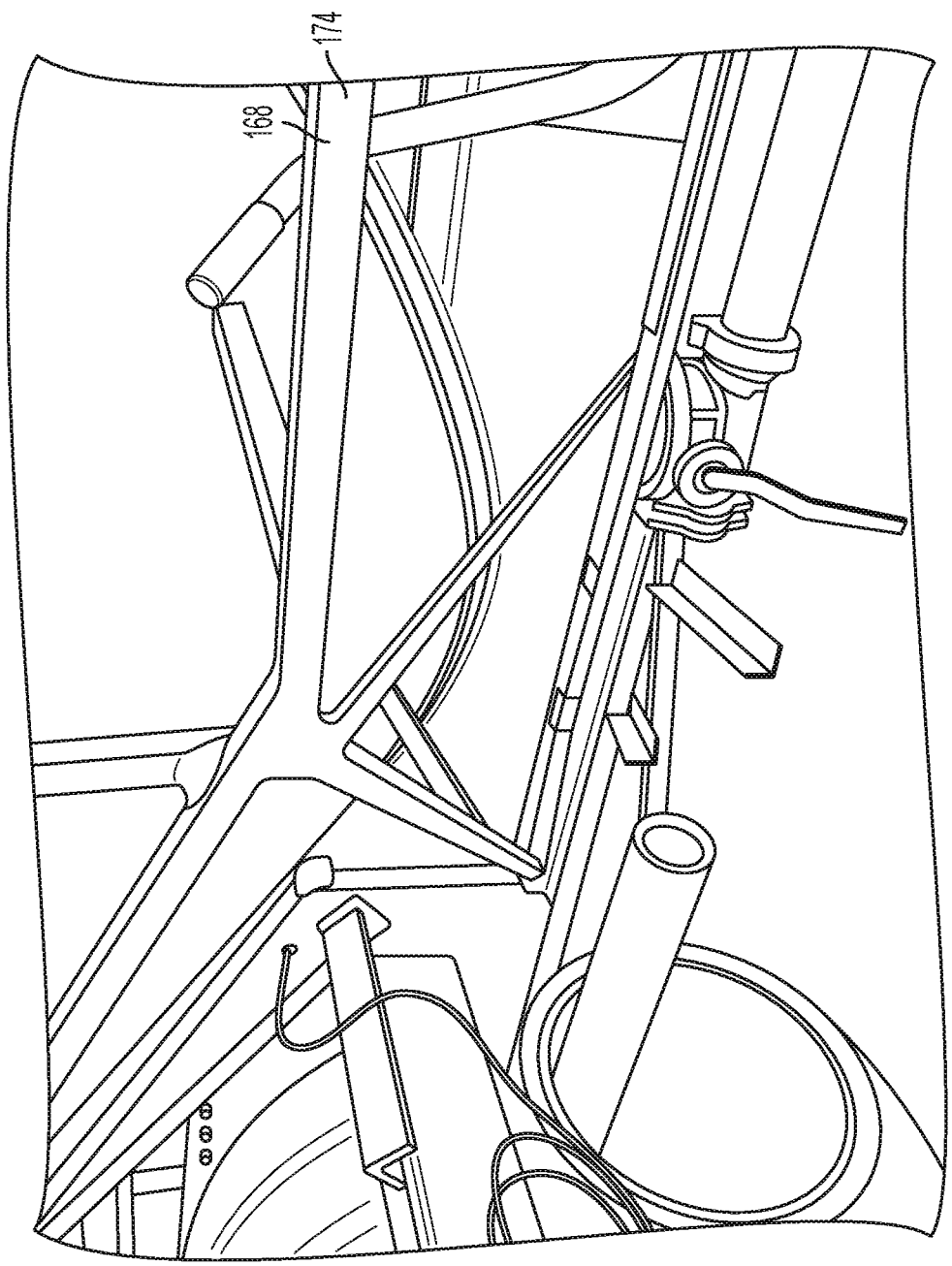
FIG. 26 is a side perspective view of the front end of the upper portion of the support structure of FIG. 19.
Figure 27:
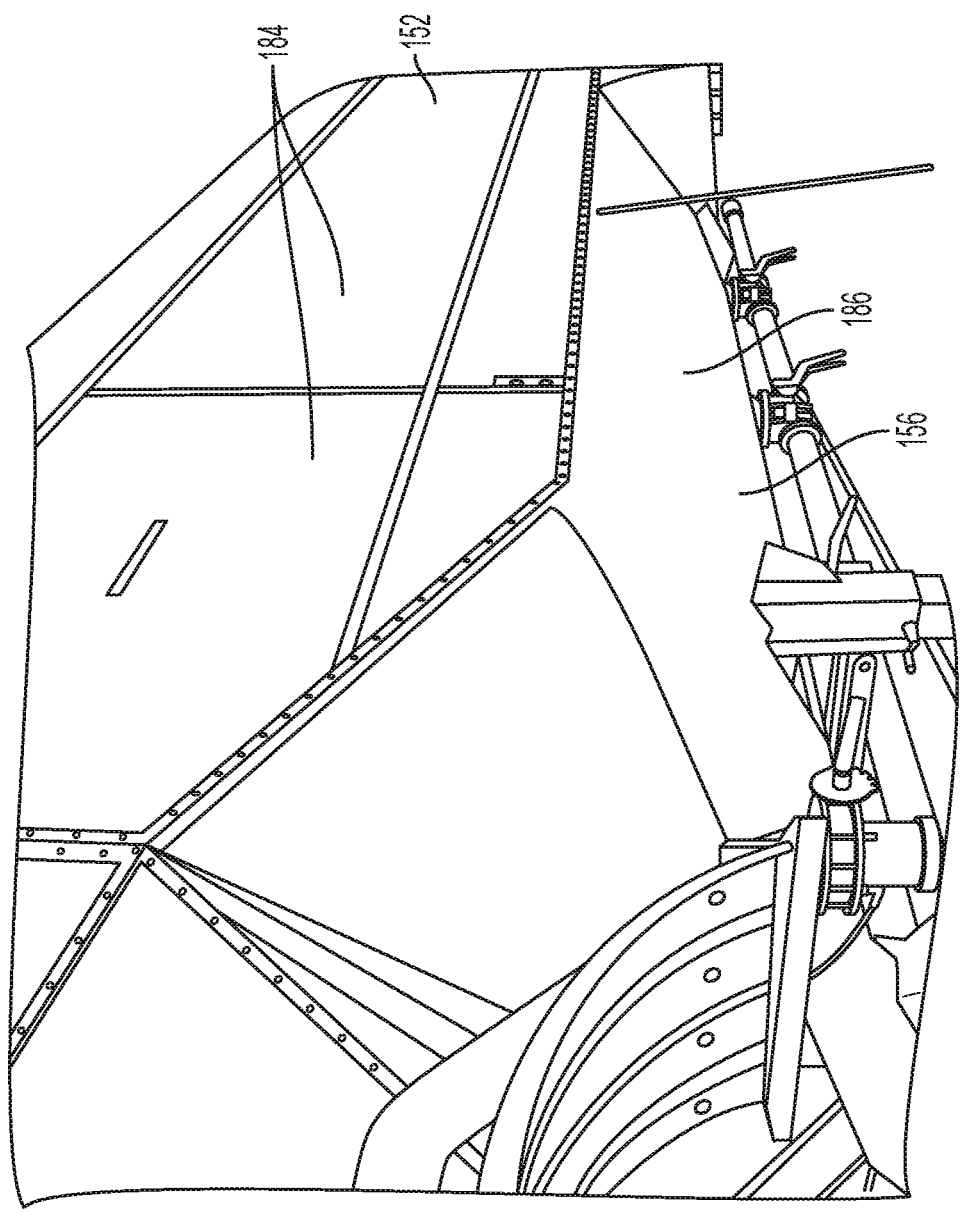
FIG. 27 is a side perspective view showing aerodynamic panels coupled to the front end of the support structure of FIG. 26.

Each side assembly 152 illustratively includes a forward aerodynamic deflector 192 and a rear wheel aerodynamic deflector 194. The forward aerodynamic deflector 192 is configured to deflect air around the side assemblies 152. The rear wheel aerodynamic deflector 194 is configured to deflect air around the rear suspension 20 of the trailer 10. The forward aerodynamic deflector 192 illustratively includes framework 196 supporting aerodynamic panels 198 (FIGS. 19 and 23). The panels 198 illustratively extend upwardly and forwardly from the lower portion 156 of the side assembly 152 adjacent the front end of the center portion 158. The rear wheel aerodynamic deflector 194 illustratively includes framework 200 supporting a shield or panel 202 (FIGS. 12 and 25). The rear wheel aerodynamic deflector 194 is illustratively supported adjacent the rear end of the center portion 158.

Figure 7:
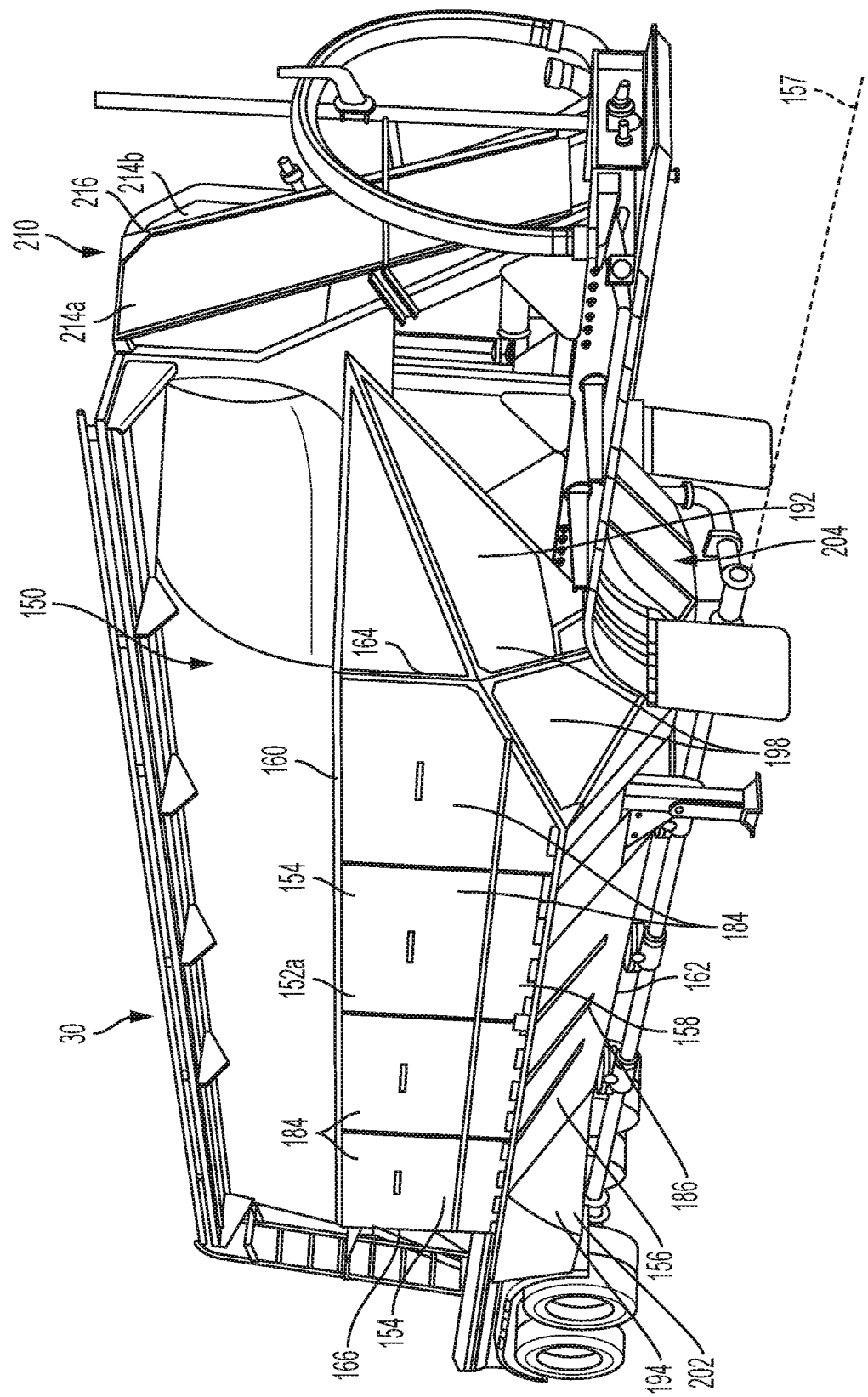
FIG. 7 is a front perspective view of the right side of the aerodynamic tank wrap of FIG. 6.
Figure 8:
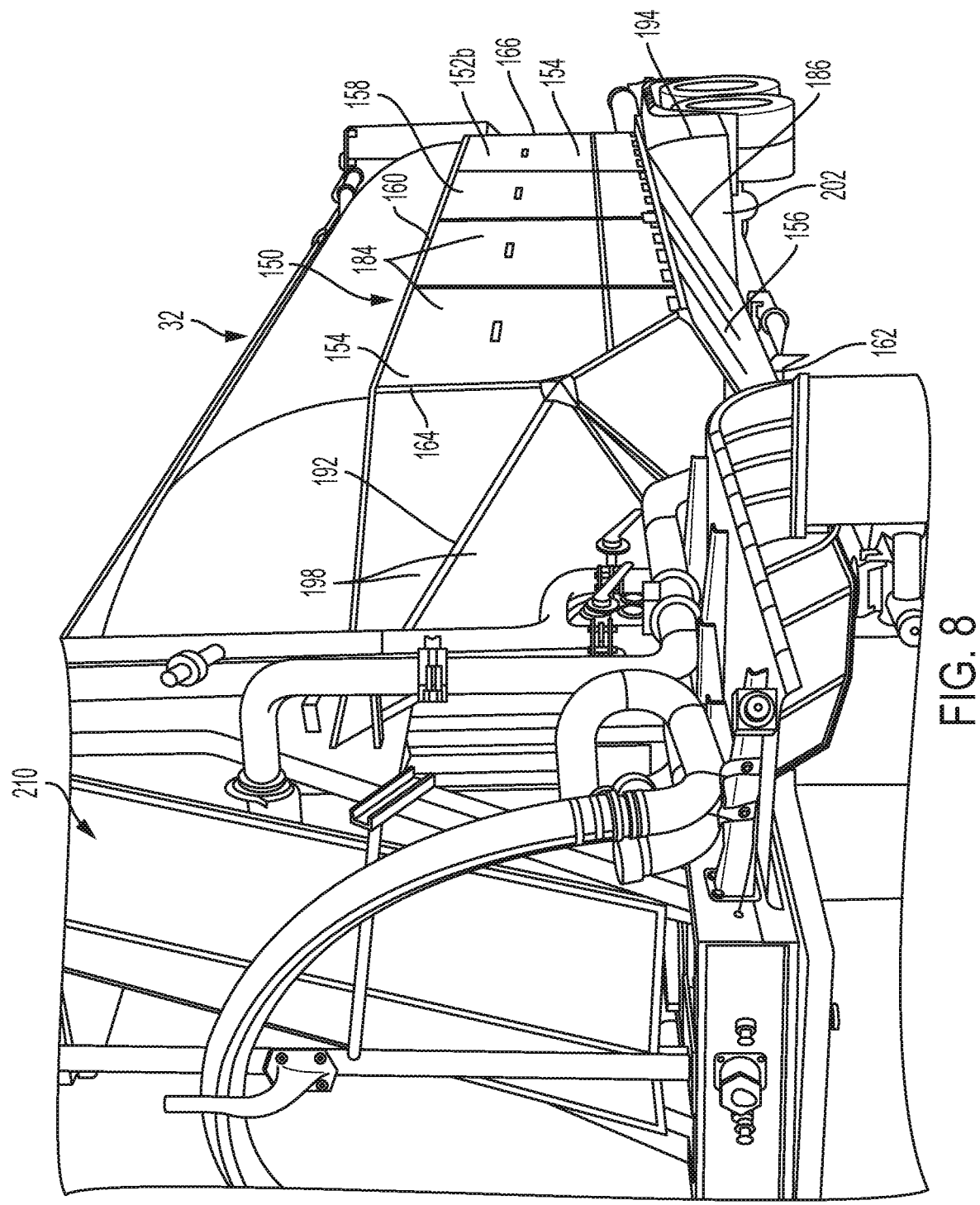
FIG. 8 is a front perspective view of the left side of the aerodynamic tank wrap of FIG. 6.
Figure 18:
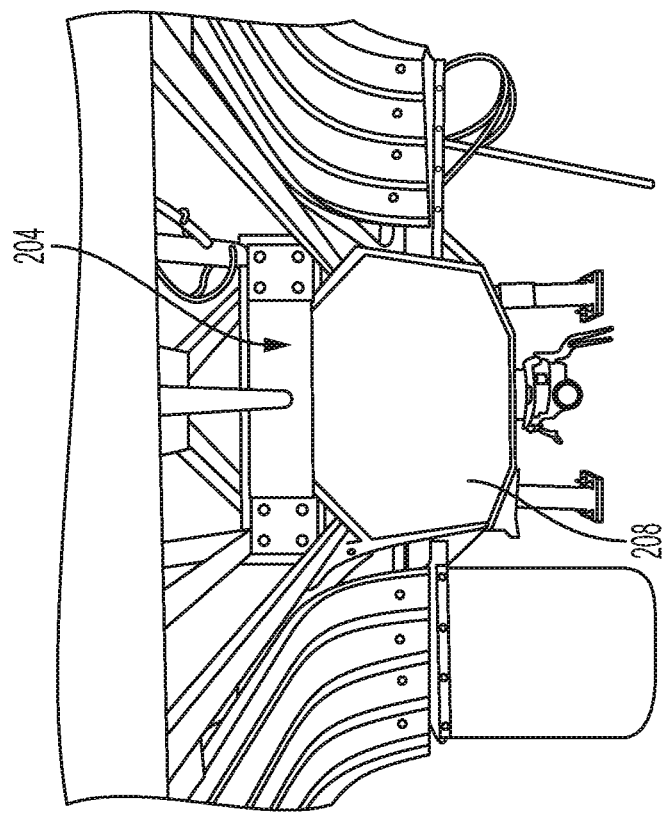
FIG. 18 is a perspective view of a lower front panel coupled to the front framework of FIG. 17.
Figure 17:
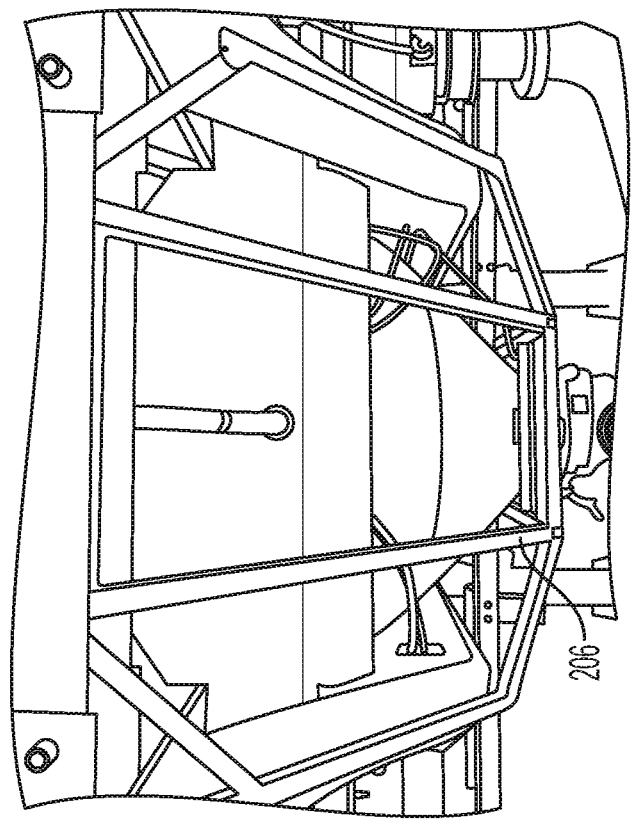
FIG. 17 is a perspective view of a lower front framework of the support structure of FIG. 10.

With reference to FIGS. 7, 17 and 18, a lower front assembly or deflector 204 may be coupled to the trailer frame 14 and extends downwardly therefrom. The lower front deflector 204 illustratively includes a front support structure or framework 206 supporting a front aerodynamic panel 208. The lower front deflector 204 is illustratively positioned laterally intermediate the first side assembly 152a and the second side assembly 152b proximate the front end, and is positioned vertically below the forward aerodynamic deflector 192.

Figure 28:
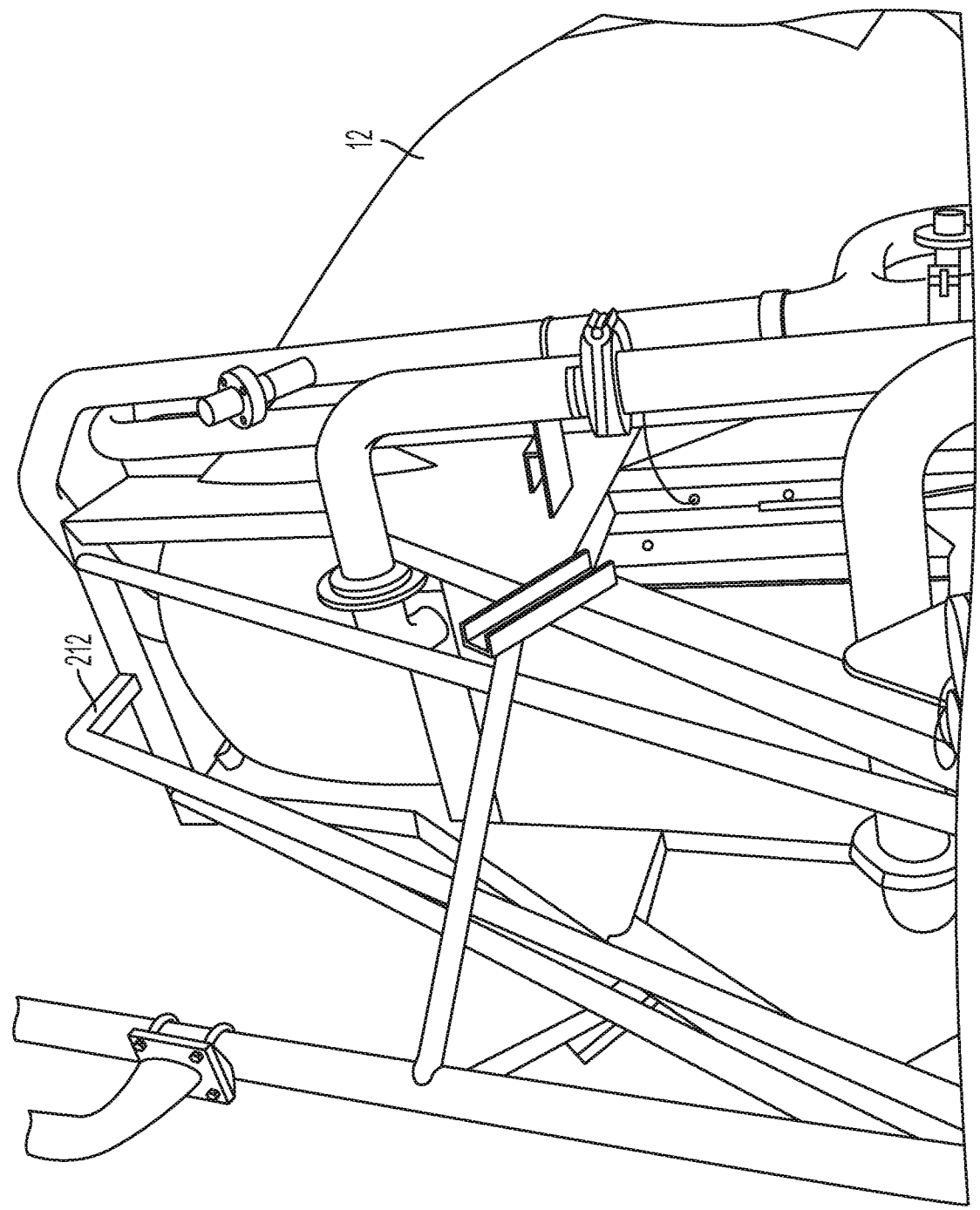
FIG. 28 is a perspective view of a support structure of a front nose deflector for use with the aerodynamic tank wrap of FIG. 6.
Figure 29:
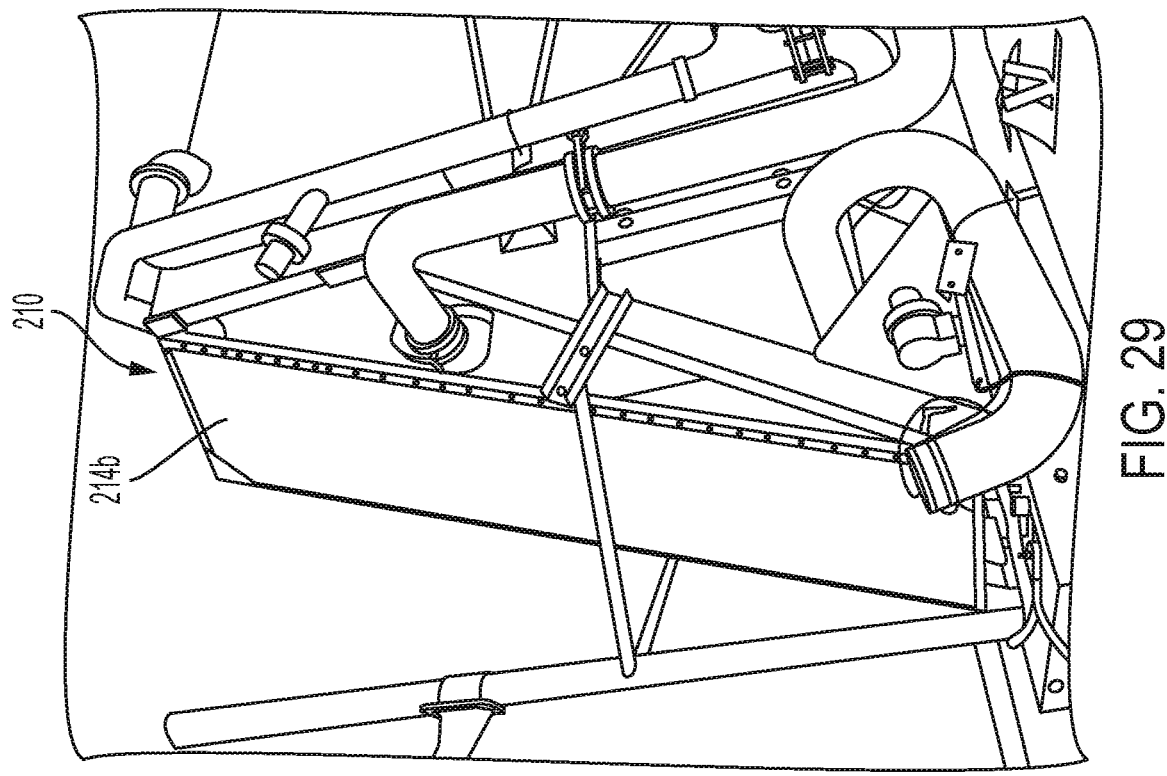
FIG. 29 is a perspective view of aerodynamic panels coupled to the support structure of FIG. 28.
Figure 30:
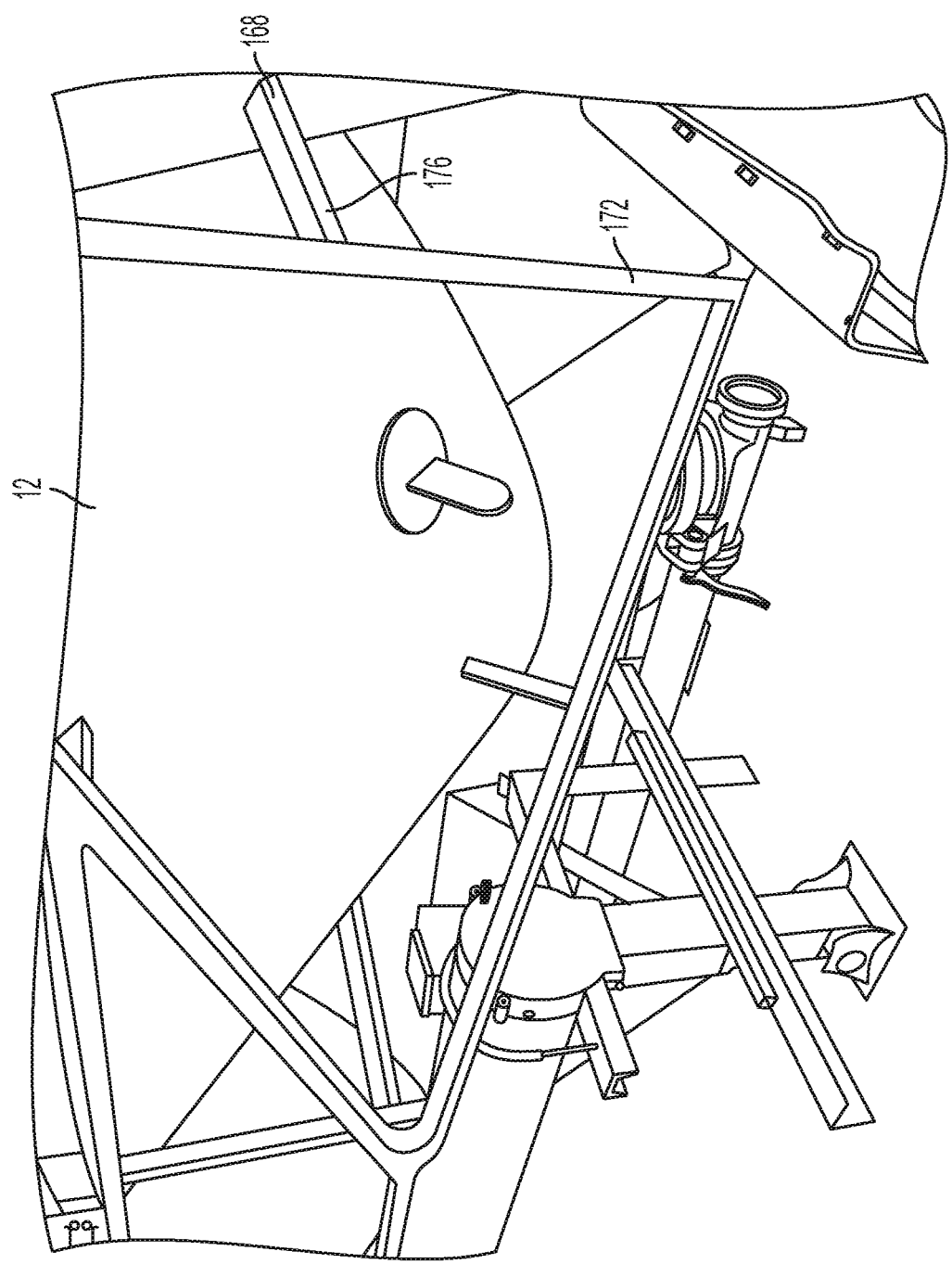
FIG. 30 is a side perspective view of the front end of the support structure of FIG. 10.
Figure 31:
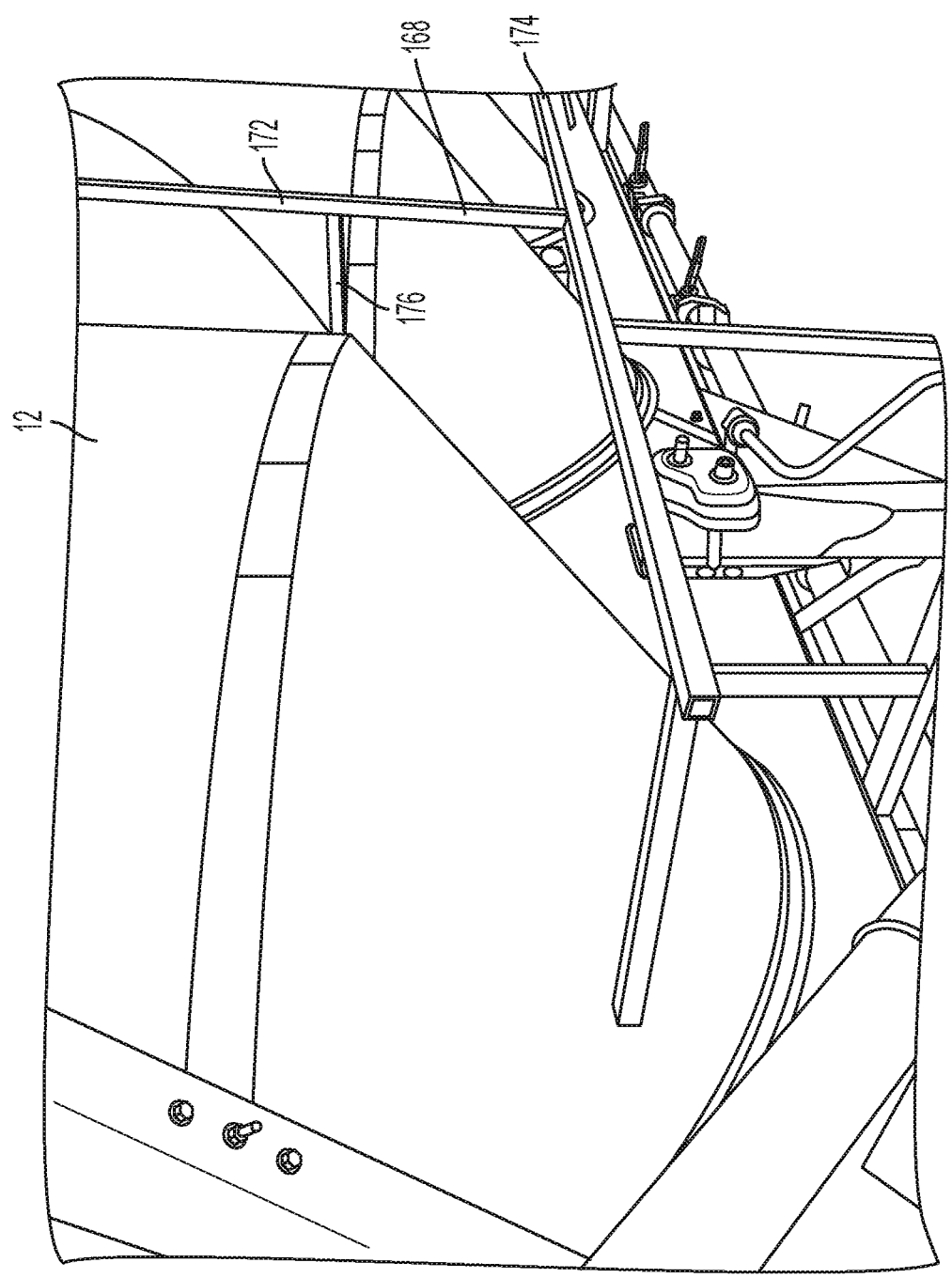
FIG. 31 is a side perspective view of the support structure of FIG. 10.
Figure 32:
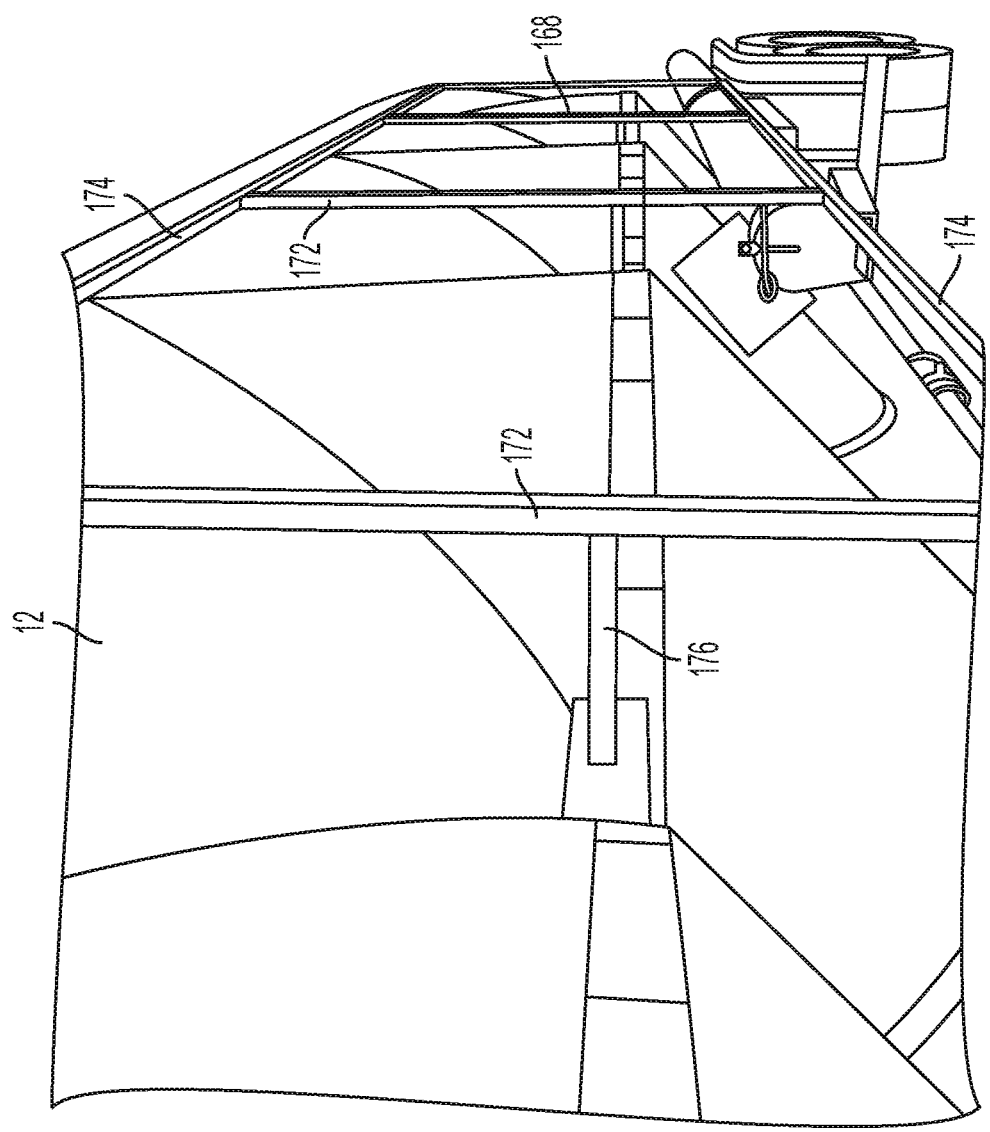
FIG. 32 is another side perspective view of the support structure of FIG. 10.

With reference to FIGS. 7, 28 and 29, a front aerodynamic nose deflector 210 may be used with the aerodynamic tank trailer wrap 150. The nose deflector 210 illustratively includes a support structure or framework 212 supporting aerodynamic panels 214. The panels 214 of the nose deflector 210 are generally angled relative to each other to deflect air. More particularly, the forward aerodynamic nose deflector 210 is positioned laterally intermediate the first side assembly 152a and the second side assembly 152b, and positioned longitudinally forward of the first and second side assemblies 152a and 152b. The forward aerodynamic nose deflector 210 includes a first aerodynamic panel 214a and a second aerodynamic panel 214b coupled to the first aerodynamic panel 214a at an apex 216. The first aerodynamic panel 214a and the second aerodynamic panel 214b angled rearwardly from the apex 216 to deflect air outwardly at the front end of the tank 12.

Although the invention has been described in detail with reference to certain preferred embodiments, variations and modifications exist within the spirit and scope of the invention as described and defined in the following claims.

The invention claimed is:
1. An aerodynamic tank trailer wrap comprising:
a first side assembly extending longitudinally between a first front end and a first rear end, and vertically between a first upper end and a first lower end, the first side assembly including at least one aerodynamic panel;
a first upper coupler configured to couple the first upper end of the first side assembly to a first side of a tank trailer;
a second side assembly extending longitudinally between a second front end and a second rear end, and vertically between a second upper end and a second lower end, the second side assembly being laterally spaced from the first side assembly and including at least one aerodynamic panel;

a second upper coupler configured to couple the second upper end of the second side assembly to a second side of the tank trailer; and a lower attachment member extending laterally below a tank of the tank trailer and the first lower end of the first side assembly and the second lower end of the second side assembly, the lower attachment member coupling together the first lower end of the first side assembly and the second lower end of the second side assembly.

2. The aerodynamic tank trailer wrap of claim 1, wherein:
the first upper coupler includes a hinge configured to pivotably couple the first upper panel to the first side of the tank trailer; and
the second upper coupler includes a hinge configured to pivotably couple the upper panel to the second side of the tank trailer.

3. The aerodynamic tank trailer wrap of claim 2, wherein:
the first side assembly includes a first upper panel, a first lower panel, and a lower coupler pivotably coupling the first upper panel with the first lower panel; and
the second side assembly includes a second upper panel, a second lower panel, and a lower coupler pivotably coupling the second upper panel with the second lower panel.

4. The aerodynamic tank trailer wrap of claim 3, further comprising:
a first movable leg configured to support the upper panel of the first side assembly in a raised position; and
a second movable leg configured to support the upper panel of the second side assembly in a raised position.

5. The aerodynamic tank trailer wrap of claim 1, wherein the at least one panel of the first side assembly and the at least one panel of the second side assembly are formed of a fiberglass reinforced plastic (frp).

6. The aerodynamic tank trailer wrap of claim 1, wherein the at least one panel of the first side assembly and the at least one panel of the second side assembly include at least one opening configured to receive a component of the tank trailer.

7. The aerodynamic tank trailer wrap of claim 1, further comprising a first rear wing extending rearwardly from the first side assembly, and a second rear wing extending rearwardly from the second side assembly, the first rear wing and the second rear wing configured to deflect air from a rear suspension of the tank trailer.

8. An aerodynamic tank trailer wrap comprising:
a first side assembly configured to be supported to a side of a tank trailer, the first side assembly including a first center portion extending vertically between a first upper end and a first lower end, and longitudinally between a first front end and a first rear end;
the first side assembly including a framework secured to the tank trailer, and a plurality of aerodynamic panels coupled to the framework;
a second side assembly configured to be supported to a side of a tank trailer, the second side assembly positioned in laterally spaced relation to the first side assembly, the second side assembly including a second center portion extending vertically between a second upper end and a second lower end, and longitudinally between a second front end and a second rear end;
the second side assembly including a framework secured to the tank trailer, and a plurality of aerodynamic panels coupled to the framework;

a forward aerodynamic deflector positioned longitudinally forward of the front end of at least one of the first side assembly and the second side assembly;
a rear wheel aerodynamic deflector positioned longitudinally rearward of the rear end of at least one of the first side assembly and the second side assembly;
a front aerodynamic nose deflector positioned longitudinally forward of the front end of the first side assembly and the front end of the second side assembly, and positioned laterally intermediate the first side assembly and the second side assembly; and
a lower front deflector positioned laterally intermediate the first side assembly and the second side assembly, and positioned vertically below the forward aerodynamic deflector.

9. The aerodynamic tank trailer wrap of claim 8, wherein each of the first side assembly and the second side assembly includes a substantially vertical upper portion, and an angled lower portion coupled to the upper portion and configured to extend inwardly toward a center axis of the tank trailer under the tank trailer.

10. The aerodynamic tank trailer wrap of claim 9, wherein each of the first side assembly and the second side assembly further comprises a pivot coupling between the vertical upper portion and the angled lower portion.

11. The aerodynamic tank trailer wrap of claim 9, wherein the forward aerodynamic deflector includes a panel extending upwardly and forwardly from the lower portion of the side assembly.

12. The aerodynamic tank trailer wrap of claim 9, wherein each rear wheel aerodynamic deflector includes a panel extending outwardly and rearwardly from the lower portion of the side assembly.

13. The aerodynamic tank trailer wrap of claim 8, wherein the aerodynamic panels are formed of a fiberglass reinforced plastic (frp).

14. The aerodynamic tank trailer wrap of claim 8, wherein the front aerodynamic nose deflector includes a first aerodynamic panel and a second aerodynamic panel coupled to the first aerodynamic panel at an apex, the first aerodynamic panel and the second aerodynamic panel angled rearwardly from the apex.

15. A tank trailer comprising:
a frame extending longitudinally between a front end and a rear end;
a tank supported by the frame, the tank including a first side and a second side;
a plurality of valves supported by the frame below the tank; and
an aerodynamic tank trailer wrap including:
a first side assembly configured to be supported to a side of a tank trailer, the first side assembly including a first center portion extending vertically between a first upper end and a first lower end, and longitudinally between a front end and a rear end;
the first side assembly including a framework secured to the tank trailer, and a plurality of aerodynamic panels coupled to the framework; and
a second side assembly configured to be supported to a side of a tank trailer, the second side assembly positioned in laterally spaced relation to the first side assembly, the second side assembly including a second center portion extending vertically between a second upper end and a second lower end, and longitudinally between a front end and a rear end;

the second side assembly including a framework secured to the tank trailer, and a plurality of aerodynamic panels coupled to the framework.

16. The tank trailer of claim 15, wherein:
the first side assembly further includes a forward aerodynamic deflector supported by the front end of the center portion, and a rear wheel aerodynamic deflector supported by the rear end of the center portion; and
the second side assembly further includes a forward aerodynamic deflector supported by the front end of the center portion, and a rear wheel aerodynamic deflector supported by the rear end of the center portion.

17. The tank trailer of claim 16, further comprising a front aerodynamic nose deflector positioned longitudinally forward of the front end of the first side assembly and the front end of the second side assembly, and positioned laterally intermediate the first side assembly and the second side assembly.

18. The tank trailer of claim 15, further comprising:
a retractable landing gear coupled to the frame;
a first landing gear opening formed in the first side assembly; and
a second landing gear opening formed in the second side assembly, wherein the first landing gear opening and the second landing gear opening receive the retractable landing gear.

19. The tank trailer of claim 15, further comprising a first upper coupler including a first upper hinge supporting the first side assembly for pivoting movement about a first upper longitudinal pivot axis, and a second upper coupler including a second upper hinge supporting the second side assembly for pivoting movement about a second upper longitudinal pivot axis.

20. The tank trailer of claim 19, wherein each of the first side assembly and the second side assembly further includes an upper panel, a lower panel and a lower hinge pivotably coupling the upper panel with the lower panel.

21. The tank trailer of claim 20, further comprising a movable leg operably coupled to each upper panel, each movable leg configured to support the upper panel in a raised position.

22. The tank trailer of claim 20, further comprising:
a rear suspension operably coupled to the frame;
a first rear wing extending rearwardly from the first side assembly; and
a second rear wing extending rearwardly from the second side assembly, wherein the first rear wing and the second rear wing are configured to deflect air from the rear suspension of the tank trailer.

* * * * *